(12) United States Patent
Inoue et al.

(10) Patent No.: US 6,415,203 B1
(45) Date of Patent: Jul. 2, 2002

(54) TOBOY DEVICE AND METHOD FOR CONTROLLING THE SAME

(75) Inventors: Makoto Inoue, Kanagawa; Hideki Noma, Tokyo, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/743,293

(22) PCT Filed: May 10, 2000

(86) PCT No.: PCT/JP00/02988
§ 371 (c)(1),
(2), (4) Date: Mar. 12, 2001

(87) PCT Pub. No.: WO00/67960
PCT Pub. Date: Nov. 16, 2000

(30) Foreign Application Priority Data

May 10, 1999 (JP) ............................................. 11-129275
May 10, 1999 (JP) ............................................. 11-165756

(51) Int. Cl.[7] ............................................. G06F 19/00
(52) U.S. Cl. ..................... 700/245; 700/246; 700/264; 700/260; 700/263; 701/70; 701/79; 706/23; 706/11; 706/16; 706/20
(58) Field of Search ................................. 700/246, 245, 700/264, 260, 263; 706/23, 11, 16, 20; 702/182, 141; 345/473, 953; 84/615, 633, 636, 658; 414/5; 701/70, 79

(56) References Cited

U.S. PATENT DOCUMENTS 6,249,780 B1 * 6/2001 Mizokawa .................... 706/23
2001/0015123 A1 * 8/2001 Nishitani et al. ............. 84/615

FOREIGN PATENT DOCUMENTS

| JP | 62-24988 | 2/1987 |
| JP | 6-117393 | 4/1994 |

OTHER PUBLICATIONS

Minamisawa et al., Leg synchronization by distributed control structure, 1996, IEEE, pp. 237–240.*
Yoneda et al., Intermittent trot gait of quadruped walking dynamic stability control of an omnidirectional walk, 1966, IEEE, pp. 3002–3007.*
Arikawa et al., Development of quadruped walking robot titan–VIII, 1996, IEEE, pp. 208–214.*
Chevallereau et al., Control of a walking robot with feet following a reference trajectory derived from ballistic motion, 1997, IEEE, pp. 1094–1099.*
Fujita et al., "Reconfigurable Physical Agents", Proceedings of the Second International Conference on Autonomous Agents, pp. 54–61, May 9–13, 1998.
Ogata et al., "Emotional Model and World Model based on the Hardware Structure", Jun. 26, 1998
Fujita, "Robot Entertainment: A Small Quadruped Autonomous Robot", Journal of the Robotics Society of Japan, vol. 16, No. 3, pp. 31, 33, Apr. 1998.

* cited by examiner

*Primary Examiner*—William A. Cuchlinski, Jr.
*Assistant Examiner*—McDieunel Marc
(74) *Attorney, Agent, or Firm*—Frommer Lawrence & Haug LLP; William S. Frommer

(57) ABSTRACT

In the robot system and the control method thereof, the motion of the movable part of which one end has been connected freely in rotation in the direction of at least one axis or more will be determined by changing the emotion/instinct model based on input information. On the other hand, the remaining amount of the battery is detected and if the above detected remaining amount of the battery becomes a prescribed level or below, besides, the internal temperature of the body part is detected and if the above detected internal temperature becomes a prescribed temperature and over, the robot system is changed into a predetermined attitude and/or appears a predetermined motion.

18 Claims, 17 Drawing Sheets

TOBOY DEVICE AND METHOD FOR CONTROLLING THE SAME

TECHNICAL FIELD

The present invention relates to a robot system and a control method thereof, and is suitably applicable to for example a pet robot.

BACKGROUND ART

In recent years, a four pedalism type pet robot which performs predetermined motions according to instructions from a user or circumferential environment has been provided and developed by the present applicant. Such pet robot has a form like a dog or a cat kept in general homes, and it performs the motions according to the instructions from the user or the circumferential environment.

As a tail of the pet robot of this kind, a tail that will be shaken in vertical direction or lateral direction according to drive of actuators built in the rear end of the body part has been provided, not only a tail in the shape of a cord that has been simply hung from the rear end of the body part.

On the other hand, in the pet robot of this kind, a battery being a storage cell provided inside the body has been used as a main power supply. Various circuits or actuators will be respectively based on electric power to be supplied from the above battery.

In the above pet robot, it can be considered that in case of shaking the tail according to the drive of the actuators, if the above tail can be bent and shaken in a direction that corresponds to its emotion at each time as a true dog or cat, a sense of affinity and a feeling of satisfaction can be further given to the user; amusement characteristic as a pet robot can be further improved.

Furthermore, the tail is not required to move as the occasion demands as the legs. The tail can be freely moved at any time. For that reason, it is further desirable that when a trouble happened inside the pet robot, the fact can be informed the unit by the motion of the tail.

Additionally, in the above pet robot, even if the battery provided in the body part is almost empty, a scheme for informing the user of the necessity of charging or replacing the above battery has not been provided yet.

If practically the battery becomes empty and the pet robot becomes in stopping state, it seems to be dead. The pet robot results in being against the aim of the pursuit of amusement. Therefore, it is extremely desirable that it can make the pet robot express appetite that real animals have to the user as wants to be charged.

In many cases, in this pet robot, a driving system including the battery has been provided in the body part. In this case, a ventilating opening has been formed at a predetermined position of the body part. External air will be let into the body part via the above ventilating opening. Thus, the internal temperature of the body part can be prevented from extremely raising.

However, in this pet robot, when the ventilating opening has been closed by floor as when the pet robot is lying down, air from the outside cannot be taken inside the pet robot. Therefore, it is feared that the internal temperature of the body part becomes extremely high, and it makes the battery unusable.

For that reason, in viewing of insuring its safety, it is extremely desirable that the above pet robot is stood upright and the internal air can be circulated via the ventilating opening just before the internal temperature of the pet robot reaches 'critical temperature'.

DISCLOSURE OF THE INVENTION

Considering the above points, the present invention provides a robot system and a control method thereof in that amusement characteristic can be remarkably improved on the other hand the necessity of battery charging can be represented by an attitude and its safety can be ensured.

To obviate such problems, according to the present invention, in a robot system having a movable part of which one end has been connected freely in rotation in the direction of at least one axis or more, motion control means for operating the movable part according to input information to be supplied, and emotion/instinct model changing means having emotion/instinct models caused by motions, for changing the emotion/instinct model based on the input information and determining the motion of the movable part have been provided. As a result, in this pet robot system, emotions which true animals have obtained based on approaches from a user, command input and a motion of itself can be represented by the motion of movable parts and an attitude. Thereby, a sense of affinity and a feeling of satisfaction and the like can be further given to the user; its amusement characteristic can be remarkably improved.

According to the present invention, in a robot system having a movable part of which one end has been connected freely in rotation in the direction of at least one axis or more, detecting means for detecting the internal state of the robot system, and motion control means for operating the movable part according to the detected result by the detecting means have been provided. As a result, in this robot system, the internal state of the above robot can be represented by the motion of movable parts and an attitude. Thereby, reaction like an animal can be shown to the user, and a sense of affinity and a feeling of satisfaction can be given to the user.

According to the present invention, in a robot system having a battery built-in as a power source, remaining amount of battery detecting means for detecting the remaining amount of the battery, and motion control means, if the remaining amount of the battery detected by the remaining amount of battery detecting means becomes a prescribed level or below, for changing the robot system into a predetermined attitude and/or making it appear a predetermined motion have been provided. As a result, in this robot system, a manner that it appeals its appetite as if it is a true animal can be transmitted to the user and giving the user a sense of affinity and a feeling of satisfaction; its amusement characteristic can be remarkably improved.

According to the present invention, in a robot system having a body part having a power source built-in and in that an exhausting opening has been formed at a predetermined position of the above body part, temperature detecting means for detecting the internal temperature of the body part, and motion control means, if the internal temperature detected by the temperature detecting means becomes a prescribed temperature and over, for changing the robot system into a predetermined attitude and/or making it appear a predetermined motion have been provided. As a result, in this robot system, trouble of the internal power source can be prevented. Thus, its safety can be ensured.

According to the present invention, in a method of controlling a robot system having a battery built-in as a power source, the first step of detecting the remaining amount of the battery, and the second step, if the above detected remaining amount of the battery becomes a prescribed level or below, of changing the robot system into a predetermined attitude and/or making it appear a predetermined motion have been provided. As a result, the robot system can be controlled so that a manner that it appeals its appetite as if it is a true animal can be transmitted to the user and giving the user a sense of affinity and a feeling of satisfaction. Thereby, a method of controlling a robot system in that its amusement characteristic can be remarkably improved can be realized.

Furthermore, according to the present invention, in a robot system having a body part having a power source built-in and in that an exhausting opening has been formed at a predetermined position of the above body part, the first step of detecting the internal temperature of the body part, and the second step, if the internal temperature detected by the temperature detecting means becomes a prescribed temperature and over, of changing the robot system into a predetermined attitude and/or making it appear a predetermined motion have been provided. As a result, the robot system can be controlled so that trouble of the power source in this pet robot system can be prevented. Thus, a method of controlling a robot system that can ensure its safety can be realized.

Figure 1:
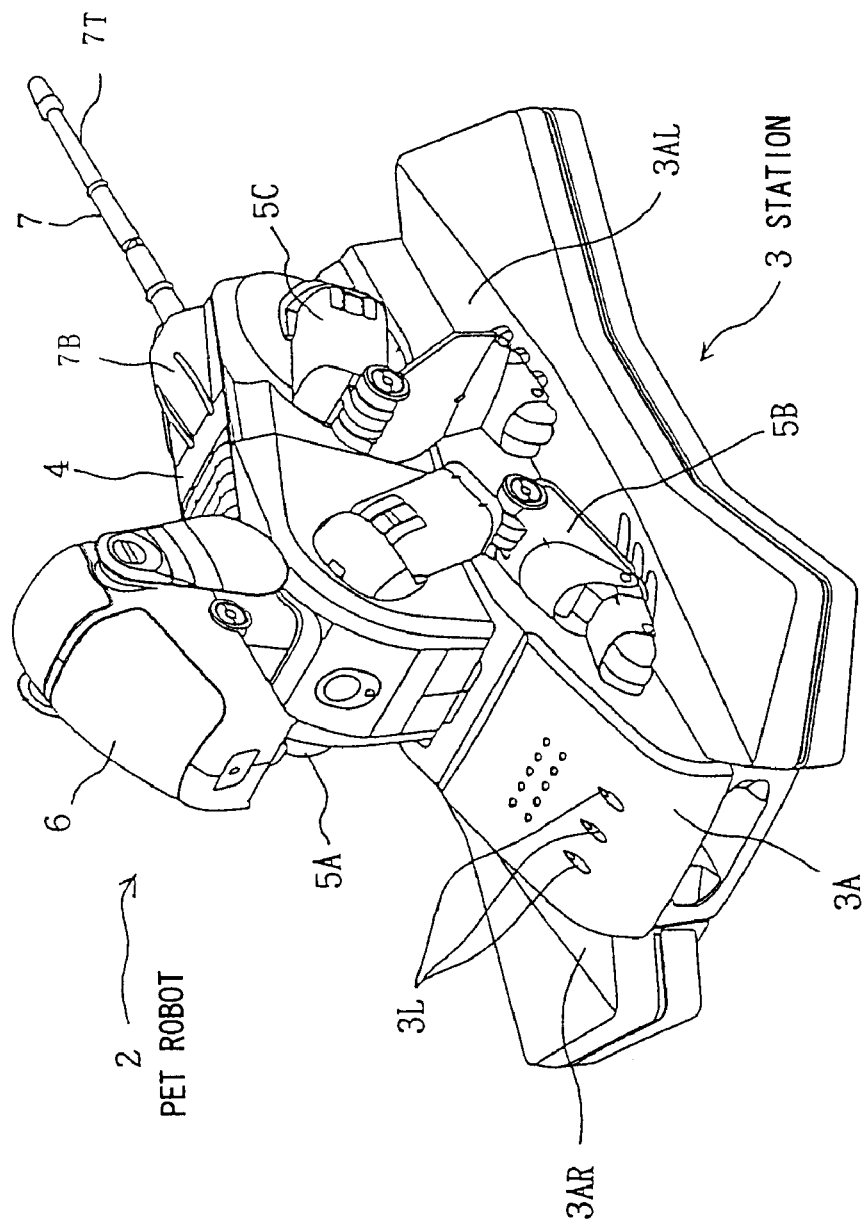
FIG. 1 is a perspective view showing the structure of a pet robot system to which the present invention has applied.

Best Mode for Carrying Out the Invention

An embodiment of the present invention will be described in detail with reference to the accompanying drawings.

(1) Configuration of Pet Robot System Applying this Invention

A reference numeral 1 generally shows a pet robot system of this embodiment. When a pet robot 2 is put on the specified position of a dedicated battery charger (hereinafter, this is referred to as station) 3 in a predetermined attitude, a battery (not shown) built in the above pet robot 2 is charged.

Figure 2:
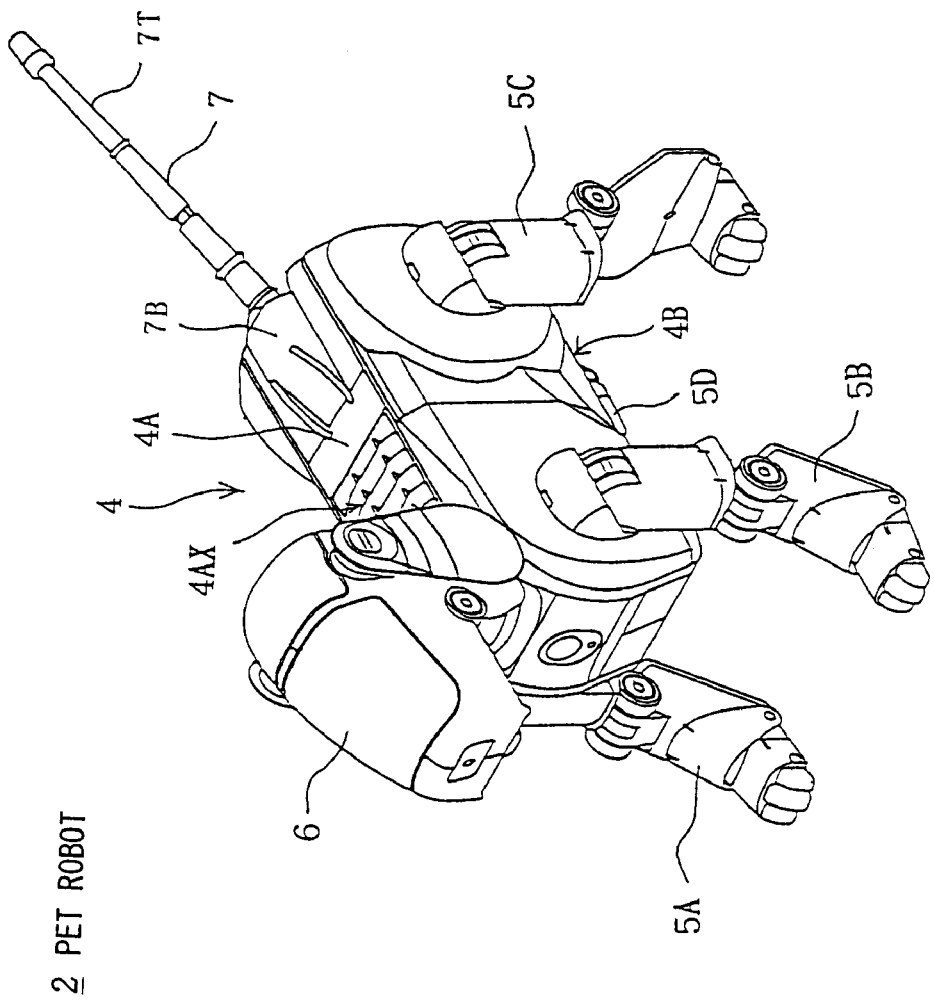
FIG. 2 is a perspective view showing the structure of the pet robot.
Figure 3:
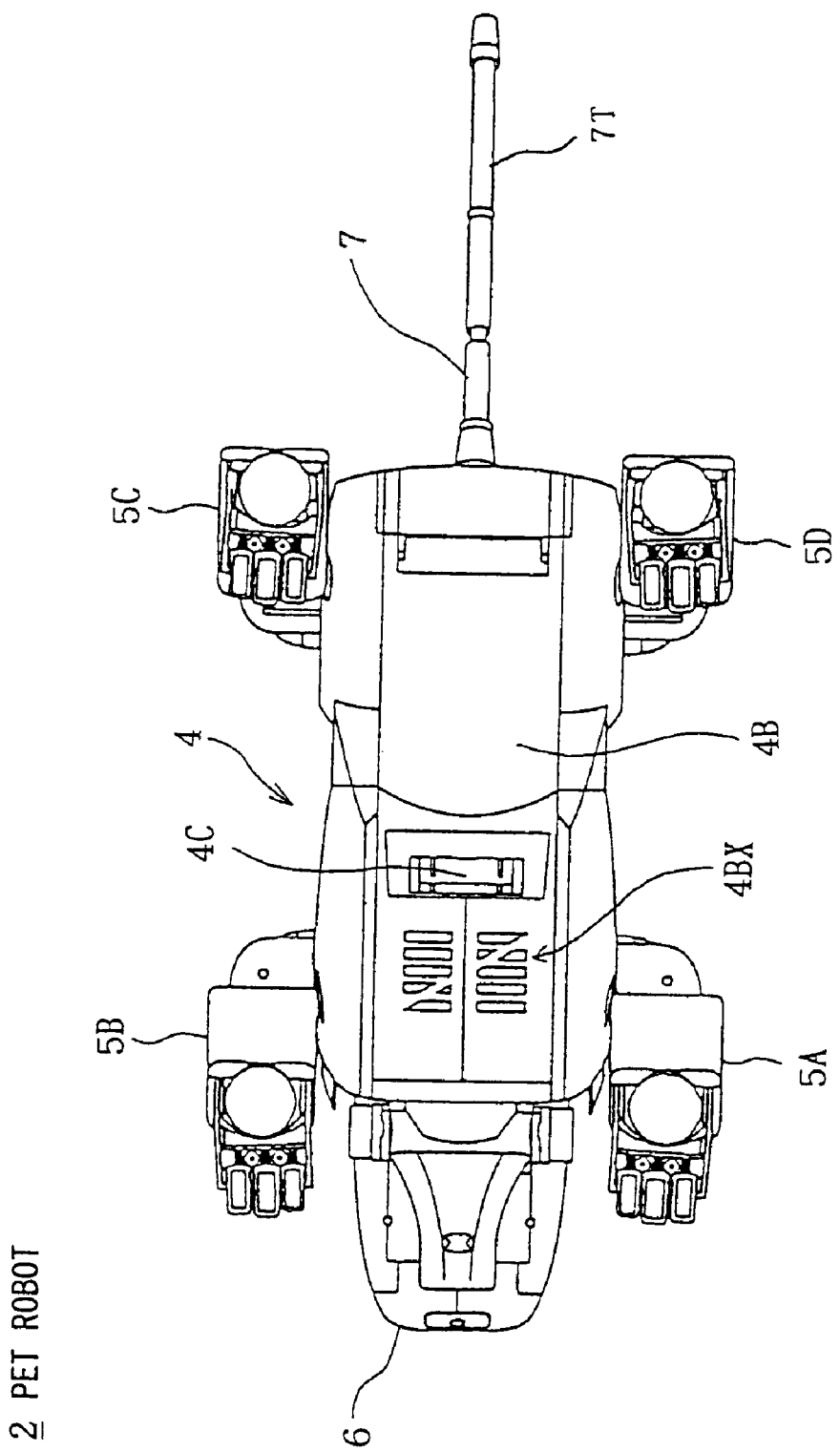
FIG. 3 is a perspective view showing the structure of the pet robot of FIG. 1.

Practically, as shown in FIGS. 2 and 3, the above pet robot 2 has been formed so that leg units 5A to 5D have been respectively connected to the front and rear on the both sides of a body unit 4 and a head unit 6 and a tail unit 7 have been respectively connected to the front end part and the rear end part of the body unit 4.

In this tail unit 7, a tail part 7T has been pulled out from a base part 7B provided on the top side of the body unit 4 with two flexibility, freely in bent and swing.

A cooling fan (not shown) has been provided inside this body unit 4. An exhausting opening 4AX and an intake 4BX via the above cooling fan have been formed on a top side 4A and a bottom side 4B respectively. Therefore, in the pet robot 2, the internal temperature of the above body unit 4 can be lowered by exhausting the air taken from the intake 4BX to the outside from the exhausting opening 4AX via the inside of the body unit 4.

On the bottom side 4B of the body unit 4, a first connector half body 4C composed of exposed plural electrodes (pads) (not shown) has been provided.

Figure 4:
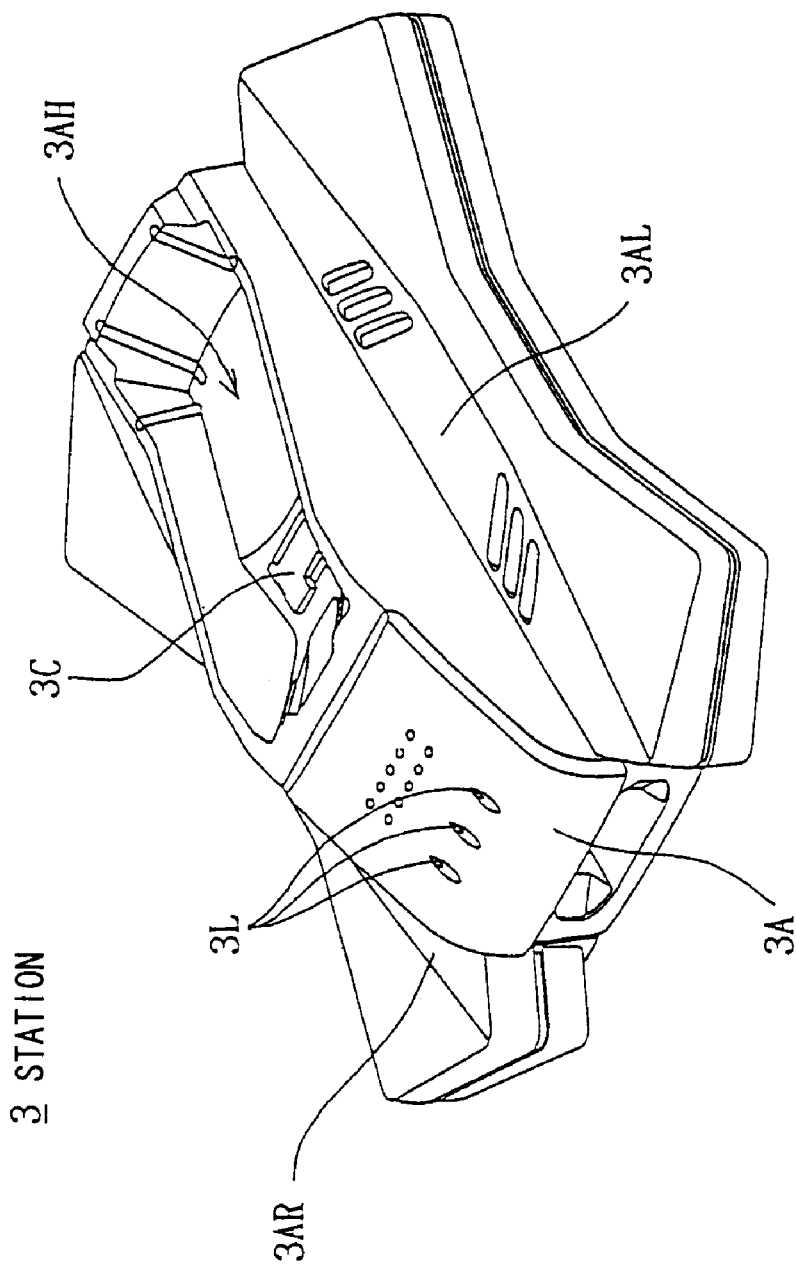
FIG. 4 is a perspective view showing the structure of a station in FIG. 1.

On the other hand, with respect to the station 3, wiring pulled out from the built-in battery charger will be connected to a home power supply via an AC adapter. As shown in FIG. 4, on the external appearance, a recessed space 3AH which is corresponding to the body unit 4 of the pet robot 2 has been formed at the center of the top side of a main body part 3A, and flat surfaces 3AR and 3AL have been respectively formed on the both sides of the above recessed space 3AH along the longitudinal direction.

In the recessed space 3AH on the station 3, a second connector half body 3C in which an electrode terminal (not shown) has been projectively formed has been provided corresponding to each electrode of the first connector half body 4C on the pet robot 2.

Moreover, on the front side of the main body part 3A of the station 3, plural light emitting diode (LED) lamps 3L have been provided. They inform the user of whether or not the plug of the AC adapter (not shown) connected to the station 3 by line has been connected to the power supply, whether or not the battery (not shown) provided in the pet robot 2 has been charged or whether or not a spare battery housed in the station 3 freely detachable has been charged, by turning on or turning on and off respectively in prescribed light emitting colors.

When the pet robot 2 is practically combined with the station 3, the pet robot 2 should be first changed into an attitude of 'lie down.', i.e. an attitude so that each of the leg units 5A to 5C are bent and the bottom side 4B of the body unit 4 is closed to the floor (hereinafter, this attitude is referred to as attitude to shift to station).

In this state, the user should lift up the pet robot 2 and putting on it so that the body unit 4 is engaged in the recessed space 3AH on the station 3. Thereby, the first connector half body 4C on the body unit 4 and the second connector half body 3C on the station 3 are abutted and connected by line.

At this time, since the pet robot 2 is in the attitude to shift to station, foot parts at the tips of the above respective leg units 5A to 5D are abutted and held on the both flat surfaces 3AR and 3AL formed on the main body part 3A of the station 3 without being obstacles when the body unit 4 is engaged in the recessed space 3AH.

(2) Internal Structure of Pet Robot 2

Figure 5:
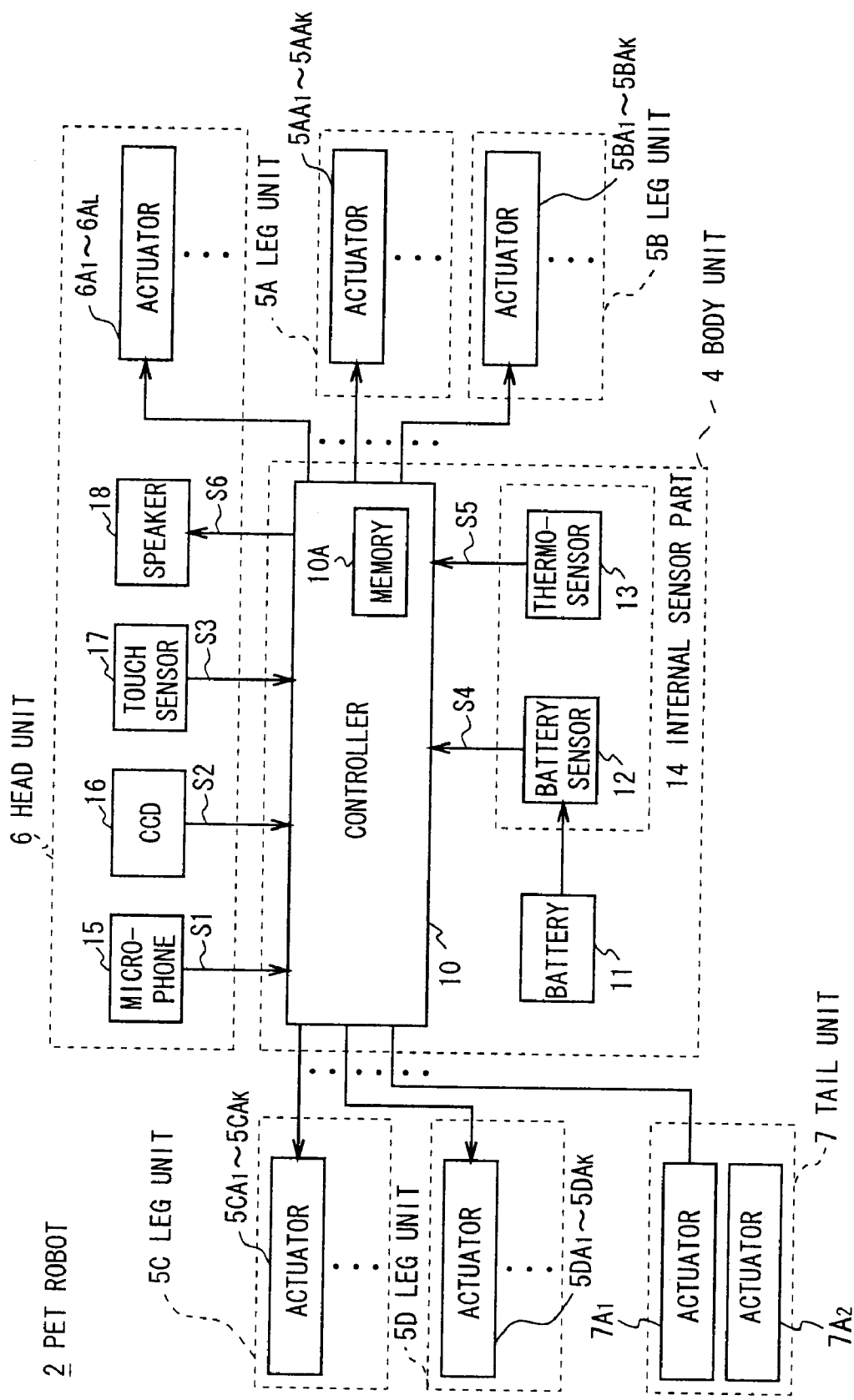
FIG. 5 is a block diagram showing the configuration of the pet robot of FIG. 1.

Here, as shown in FIG. 5, the body unit 4 of the pet robot 2 contains a controller 10 for controlling general motions of this pet robot 2, a battery 11 being the power source of this pet robot 2, an internal sensor part 14 composed of a battery sensor 12, etc.

In the head unit 6, a microphone 15 which corresponds to "ear", a charge coupled device (CCD) camera 16 which corresponds to "eye", a touch sensor 17, a speaker 18 which corresponds to "mouse", etc. have been disposed at respective predetermined positions.

Actuators $5AA_1$ to $5AA_K$, $5BA_1$, to $5BA_K$, $5CA_1$ to $5CA_K$, $5DA_1$ to $5DA_K$, $6A_1$ to $6A_{L, 7A1}$ and $7A_2$ have been respectively disposed at the respective joint parts of the leg units 5A to 5D, the respective joined parts of the leg units 5A to 5D and the body unit 4, the joined part of the head unit 6 and the body unit 4, and the joined part of the tail unit 7 and the body unit 4.

The microphone 15 in the head unit 6 picks up an instructing voice such as "walk.", "lie down.", "follow the ball." or the like that was given from the user as a musical scale by means of a sound commander not shown (commander for generating sounds different in musical scale corresponding to operating contents), and transmitting thus obtained voice signal S1 to the controller 10. On the other hand, the CCD camera 16 picks up an image around the pet robot 2, and transmitting thus obtained image signal S2 to the controller 10.

The touch sensor 17 has been provided at the top of the head unit 6 as shown in FIG. 2. It detects a pressure received by physical approaches from the user, such as "stroked", "slapped" or the like, and transmitting the detected result to the controller 10 as a pressure detection signal S3.

The battery sensor 12 in the body unit 4 detects the remaining amount of the battery 11 in five phased levels, and sequentially transmitting the detected result in the above levels to the controller 10 as a remaining amount of battery detection signal S4. In this case, the battery sensor 12 detects the remaining amount of the battery 11 in phased levels when it is 80 [%] and over, 80 to 50[%], 50 to 25[%], 25 to 20[%], and 20[%] or below, respectively as "Full", "Middle-Full", "Middle", "Low" and "Low-Low".

The thermosensor 13 in the body unit 4 detects the internal temperature of the pet robot 2, and transmitting the detected result to the controller 10 as a heat detection signal S5.

The controller 10 determines the state around the pet robot 2, the presence of instructions or approaches from the user or the like, based on the voice signal S1, image signal S2, pressure detection signal S3, remaining amount of battery detection signal S4 and heat detection signal S5 given from the microphone 15, CCD camera 16, touch sensor 17, battery sensor 12 and thermosensor 13.

Then, the controller 10 decides the following motion based on these determined results and a control program that has been previously entered. It makes a necessary actuator $5AA_1$ to $5AA_K$, $5BA_1$ to $5BA_K$, $5CA_1$ to $5CA_K$, $5DA_1$ to $5DA_K$, $6A_1$ to $6A_L$, $7A_1$ and $7A_2$ drive based on the decision result, and driving each of the leg units 5A to 5D. Thereby, the pet robot 2 performs motions such as vertically and laterally shaking the head unit 6, moving the tail unit 7, walking, etc.

Additionally, at this time, the controller 10 supplies a predetermined voice signal S6 to the speaker 18 as the occasion demands, and generating a voice based on the above voice signal S6 to the outside, or it makes LEDs (not shown) provided at the position of "eye" of this pet robot 2 turn on, off or on and off.

In this manner, this pet robot 2 can be autonomously moved according to the state around it, the control program, and so on.

(3) Configuration of Tail Unit of Pet Robot

Here, with respect to the tail unit 7, as shown in FIG. 2 described in the above, one end of the tail part 7T has been connected to a gearbox (not shown) in the base part 7B provided on the top of the body unit 4.

Figure 6:
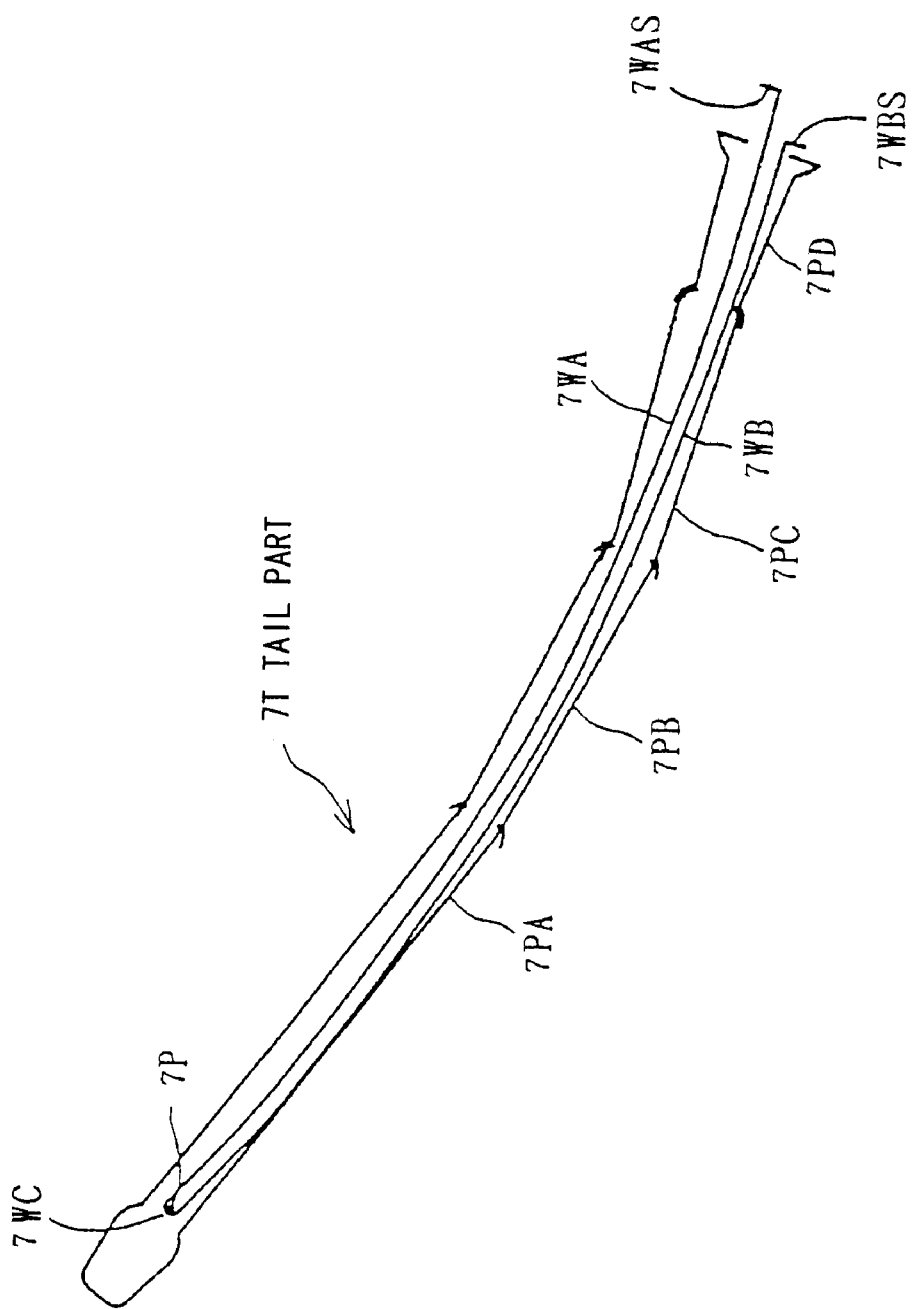
FIG. 6 is a schematic diagram showing a tail part in a tail unit.

As shown in FIG. 6, this tail part 7T forms curved mechanism composed of two pieces of almost parallel wire parts 7WA and 7WB forming a hair pin shape by bending for instance a piece of wire 7W made of very elastic alloy in almost U shape (or in almost V shape) at the center part.

In the outer circumference of this wire parts 7WA and 7WB in hair pin shape, plural cylindrical members 7PA to 7PD molded by synthetic resin or light metal or the like have been inserted in series. Each of the above cylindrical members 7PA to 7PD have been connected freely in bending as the so-called spherical bearing (a kind of universal joint), so that polyarticular mechanism has been formed.

Moreover, at the tip position of the cylindrical member 7PA that is the most tip of the tail part 7T, a pin 7P has been put perpendicularly to the axis direction, and holding the bent part 5WC of the wire 7W by abutting. Thereby, the wire 7W can be prevented from slipping out of the cylindrical member 7PA.

Furthermore, from the cylindrical member 7PD that is the most base end, the base ends 7WAS and 7WBS of the two pieces of wire parts 7WA and 7WB have been projected in bending in almost L shape to mutually counter directions, and respectively connected to a gearbox 22 (FIG. 7) that will be described later.

Figure 7:
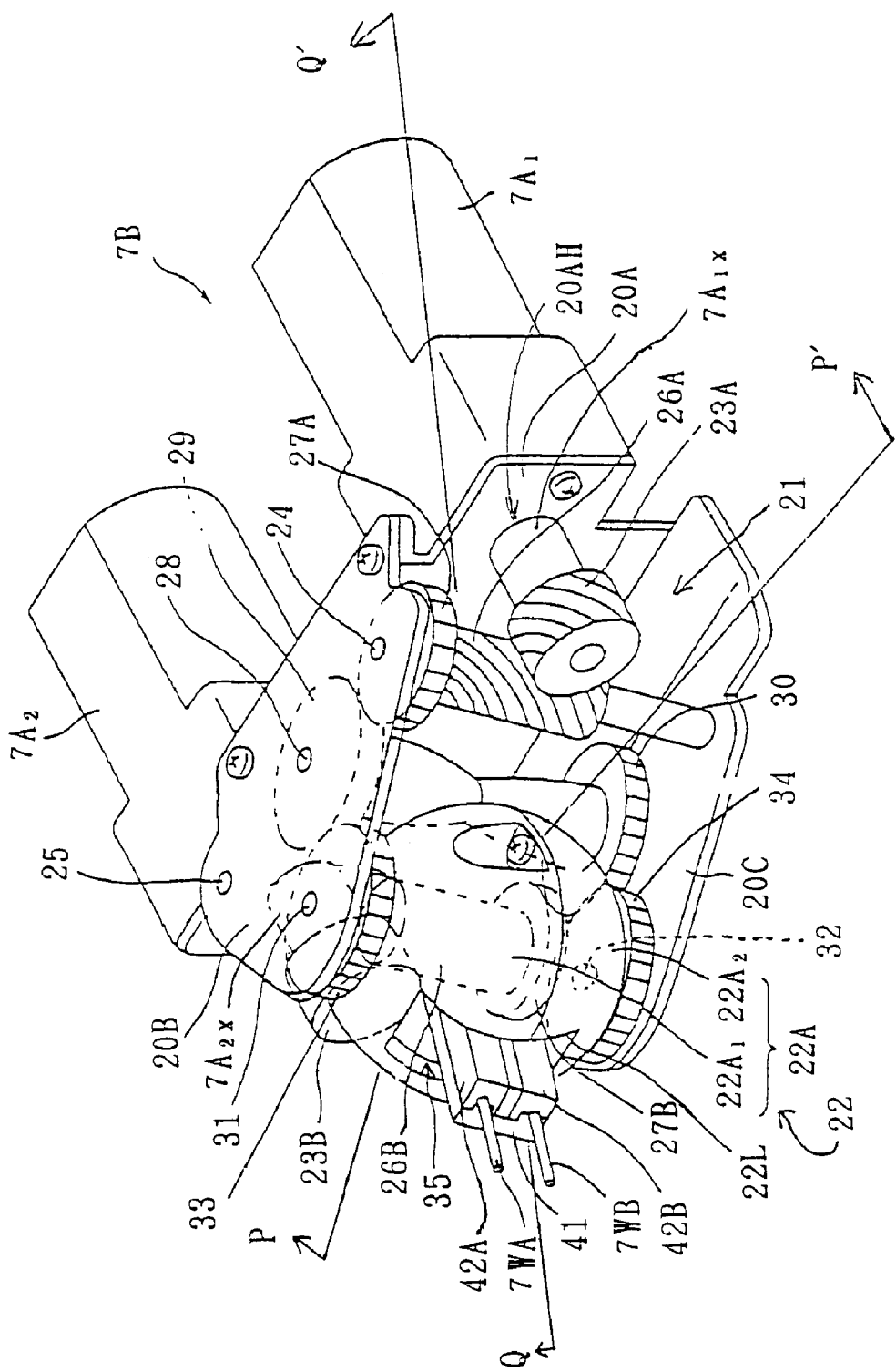
FIG. 7 is a schematic perspective view showing the internal structure of a base part in the tail unit.

Here, FIG. 7 shows the internal structure of a base cover (not shown) in the base part 7B. A pair of actuators $7A_1$ and $7A_2$ formed by geared motors have been fixed to the back plate 20A of a bearing member 20 formed in almost U-shaped section. The output shafts $7A_{1X}$ and $7A_{2X}$ of the above actuators $7A_1$ and $7A_2$ have been penetrated respectively inside via the respective through holes 20AH formed on the back plate 20A.

In this bearing member 20, a gear transmission mechanism 21 has been provided. The output shafts $7A_{1X}$ and $7A_{2X}$ of the actuators $7A_1$ and $7A_2$ have been engaged with the gearbox 22 via the above gear transmission mechanism 21. That is, in this gear transmission mechanism 21, helical gears 23A and 23B fixed to the output shafts $7A_{1X}$ and $7A_{2X}$ of the actuators $7A_1$ and $7A_2$, and helical gears 26A and 26B fitted freely in rotation centering around a first and a second shafts 24 and 25 supported between the top plate 20B and the bottom plate 20C of the bearing member 20 have been respectively engaged.

At the top end of the first shaft 24, a gear 27A which rotates centering around the above first shaft 24 has been combined with the helical gear 26A in one unit body. And at the bottom end of the second shaft 25, a gear 27B which rotates centering around the above second shaft 25 has been combined with the helical gear 26B in one unit body.

At the top end and the bottom end of a third shaft 28 supported between the top plate 20B and the bottom plate 20C of the bearing member 20, gears 29 and 30 have been respectively fitted freely in rotation centering around the above third shaft 28. The gear 29 on the top end has been engaged with the gear 27A fitted at the top end of the first shaft 24. And the gear 30 on the bottom end has been engaged with the gear 27B fitted to the bottom end of the second shaft 25.

Furthermore, by the top plate 20B and the bottom plate 20C of the bearing member 20, one ends of a vertical pair of fourth and fifth shafts 31 and 32 that are mutually coaxial have been respectively supported. And the gearbox 22 in almost spherical form has been fitted so as to connect the above fourth and fifth shafts 31 and 32. With the both top and bottom ends of this gearbox 22, gears 33 and 34 respectively fitted freely in rotation centering around the fourth and fifth shafts 31 and 32 have been engaged corresponding to the gears 29 and 30 fitted to the top end and the bottom end of the third shaft 28.

Figure 8:
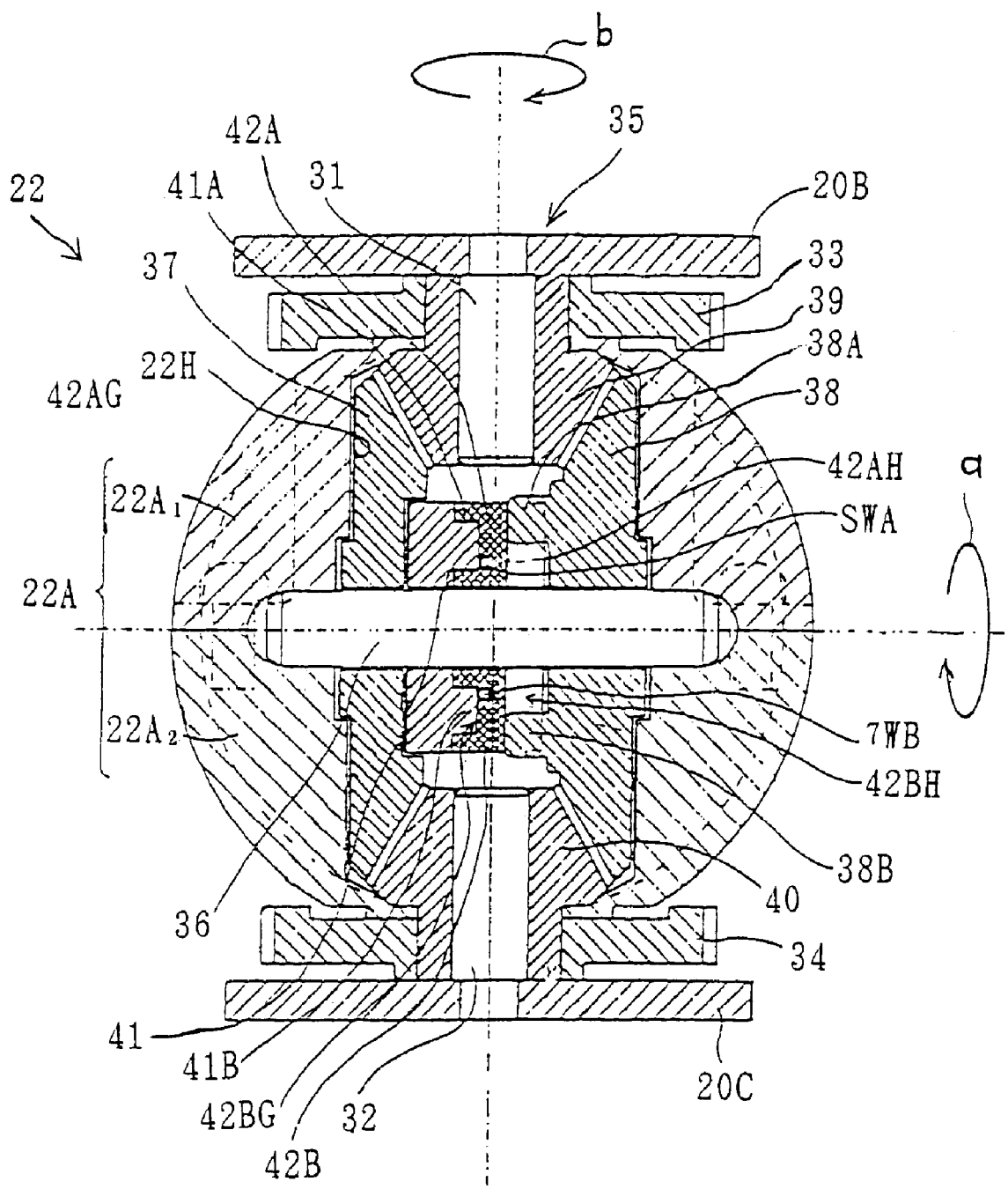
FIG. 8 is a partial sectional view showing the internal structure of a gearbox in the base part of FIG. 7.

As shown in FIG. 8 that a section by a line P–P' in FIG. 7 has taken, this gearbox 22 forms a spherical shell body 22A in which a pair of half-spherical shell bodies $22A_1$ and $22A_2$ have been combined. And it has been formed so that a differential gear mechanism 35 has been built in a hollow part 22H in the above spherical shell body 22A so as to be engaged with the fourth and fifth shafts 31 and 32.

This differential gear mechanism 35 has a spindle 36 that has been held freely in rotation in the spherical shell body 22A so as to be orthogonalized to the fourth and fifth shafts 31 and 32. A lateral pair of bell-shaped gears 37 and 38 having a large diameter that have been inserted freely in rotation in an arrow "a" direction or the inverted direction in the hollow part 22H centering around the above spindle 36, have been engaged with both a vertical pair of bell-shaped gears 39 and 40 having a small diameter that have been coaxially combined with the gears 33 and 34 fitted to the fourth and fifth shafts 31 and 32 in one unit body.

Between this lateral pair of bell-shaped gears 39 and 40, a slide guide 41 made of synthetic resin or the like has been fitted freely in rotation centering around the above spindle 36 so that the longitudinal direction is orthogonal to the spindle 36, and also a vertical pair of sliders 42A and 42B have been engaged with the slide guide 41 freely in sliding in the longitudinal direction so that the above spindle 36 is held between them.

In this case, on one side of the slide guide 41, a vertical pair of guide rails 41A and 41B which are in parallel have been formed along the longitudinal direction. On the other hand, on one sides of the sliders 42A and 42B, guide grooves 42AG and 42BG have been respectively formed corresponding to the above guide rails 41A and 41B. In the guide grooves of the sliders, one end of the wire parts 7WA and 7WB have been respectively embedded along the groove direction to support the entire tail part 7T.

Furthermore, inside of the one of the bell-shaped gears 38 having large diameter, a vertical pair of projections 38A and 38B having pin shapes have been formed in one unit body so as to keep the positional relationship of mutually 180[°]. On the other sides of the vertical pair of sliders 42A and 42B, a vertical pair of slide grooves 42AH and 42BH which are parallel to the fourth and fifth shafts 31 and 32 have been formed respectively corresponding to the above projections 38A and 38B.

Figure 9:
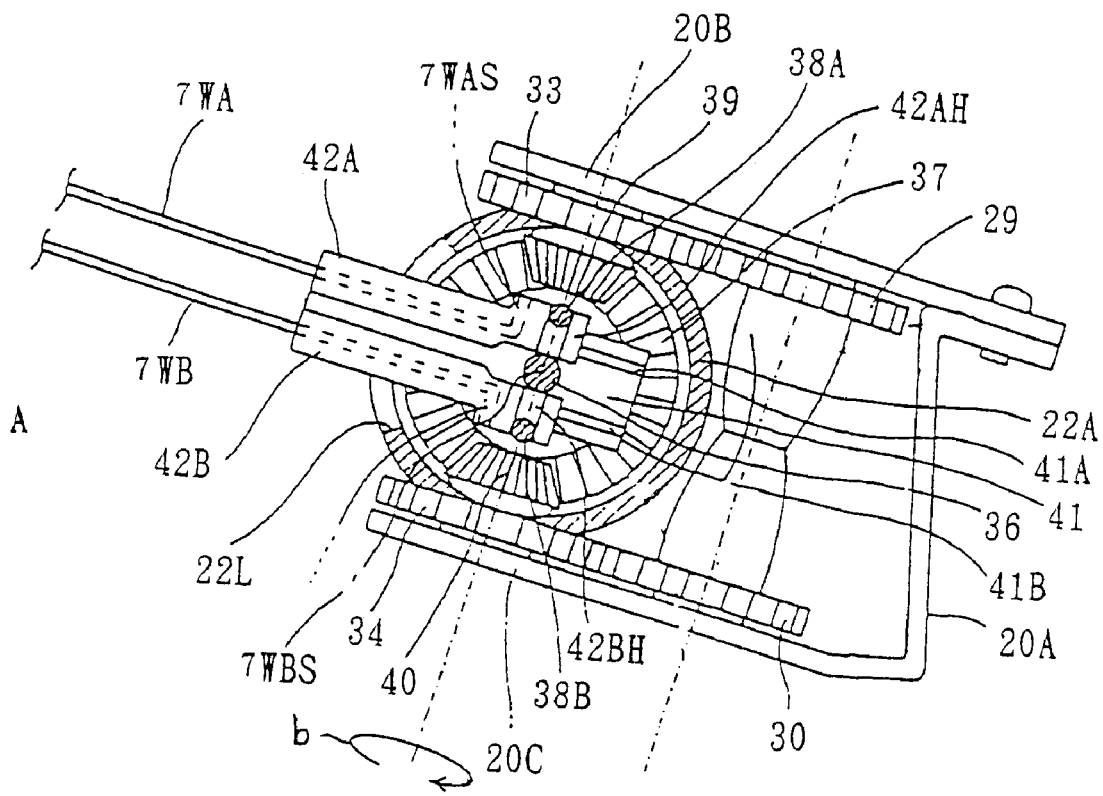
FIGS. 9A and 9B are partial sectional views for explaining the operating state of a differential gear mechanism in the gear box of FIG. 8.
Figure 9:
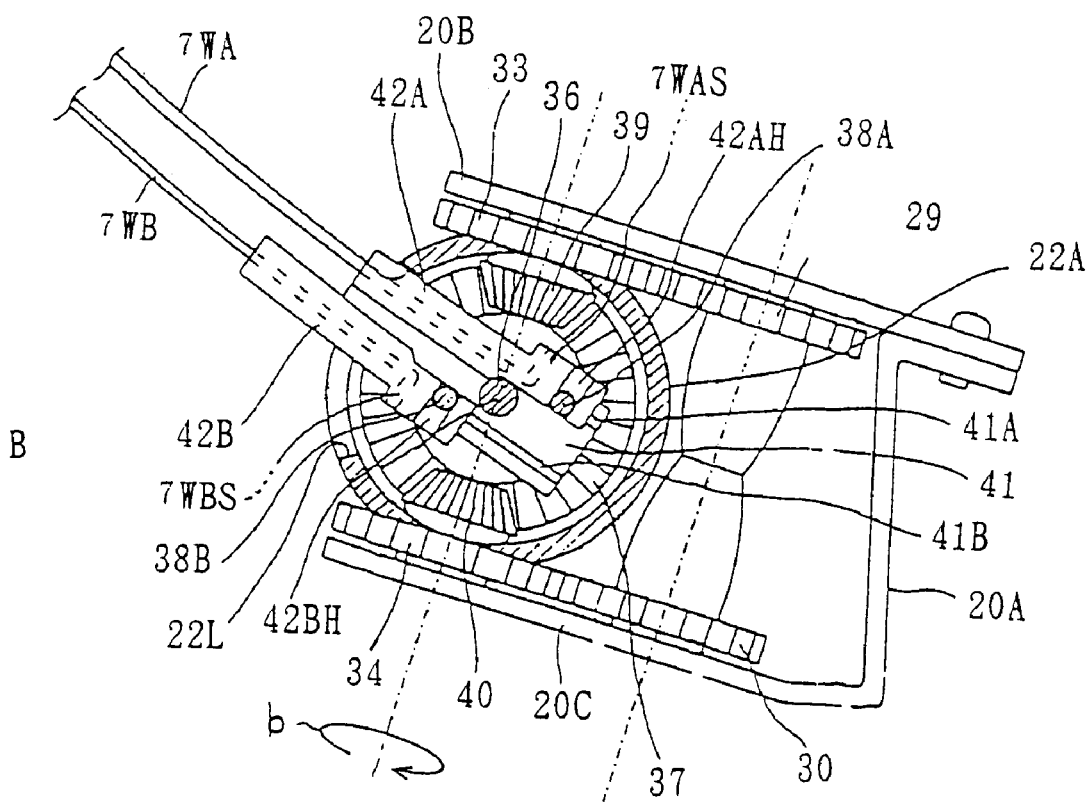

Thereby, as shown in FIGS. 9A and 9B that sections by a line Q–Q' in FIG. 7 have taken, when the large diameter bell-shaped gears 37 and 38 are rotated in mutually inverse directions (an arrow "a" direction and the inverse direction) centering around the spindle 36, each of the projections 38A and 38B of the above bell-shaped gear 38 are abutted and pressurized in the rotational direction of the bell-shaped gear 38 while respectively sliding along the slide grooves 42AH and 42BH. Thereby, the sliders 42A and 42B can be slid on the slide guide 41 in the mutually inverse directions. Accordingly, in the head part 7B, when the pair of actuators $7A_1$ and $7A_2$ are drive-controlled at the same rotating speed so that each of the output shafts $7A_{1X}$ and $7A_{2X}$ are rotated in the mutually inverse directions, the vertical pair of gears 33 and 34 fitted to the fourth and the fifth shafts 31 and 32 through the gear transmission mechanism 21 are rotated in the mutually inverse directions (an arrow "b" direction and the inverse direction) in one unit body to the vertical pair of small diameter bell-shaped gears 39 and 40 forming the differential gear mechanism 35. Thereby, the lateral pair of large diameter bell-shaped gears 37 and 38 forming the differential gear mechanism 35 pushes out one of the pair of sliders 42A and 42B in the longitudinal direction of the slide guide 41, and at the same time, pulls back the other, while rotating in the mutually inverse directions (the arrow "a" direction and the inverse direction).

In this manner, in the tail unit 7, the two pieces of wire parts 7WA and 7WB in the tail part 7T are mutually pushed out or pulled back according to the sliding motion of the sliders 42A and 42B by the differential gear mechanism 35 in the gearbox 22, so that the wire 7W can be bent.

Consequently, in the tail unit 7, when the pair of actuators $7A_1$ and $7A_2$ are drive-controlled so that the output shafts $7A_{1X}$ and $7A_{2X}$ are rotated at the same rotating speed in the mutually inverse directions, the tail part 7T can be bent in the vertical direction at a desired amplitude or can be shaken in the vertical direction at a desired amplitude and speed according to the above drive control.

As shown in FIG. 7, at the predetermined front position of the spherical shell body 22A in the gearbox 22, an oblong hole 22L parallel to the fourth and fifth shafts 31 and 32 and in a prescribed size has been opened. The tail part 7T pulled out from the slide guide 41 and the vertical pair of sliders 42A and 42B in the gearbox 22 has been projected through the above oblong hole 22L. Therefore, the tail part 7T can be bent or shaken in the vertical direction within the range between the both vertical ends of the oblong hole 22L.

Furthermore, in the head part 7B, when the pair of actuators $7A_1$ and $7A_2$ are drive-controlled at the same rotating speed so that the output shafts $7A_{1X}$ and $7A_{2X}$ are rotated in the same direction, the vertical pair of gears 33 and 34 fitted to the fourth and the fifth shafts 31 and 32 via the gear transmission mechanism 21 are rotated in the same direction (the arrow "b" direction or the inverse direction). At this time, the vertical pair of small diameter bell-shaped gears 39 and 40 forming the differential gear mechanism 35 cannot be rotated in the same direction because they have been engaged with both the lateral pair of large diameter bell-shaped gears 37 and 38. As a result, the differential gear mechanism 35 i.e. the gearbox 22 is rotated in the same direction as the vertical pair of gears 33 and 34 in one unit body centering around the fourth and fifth shafts 31 and 32.

Figure 10:
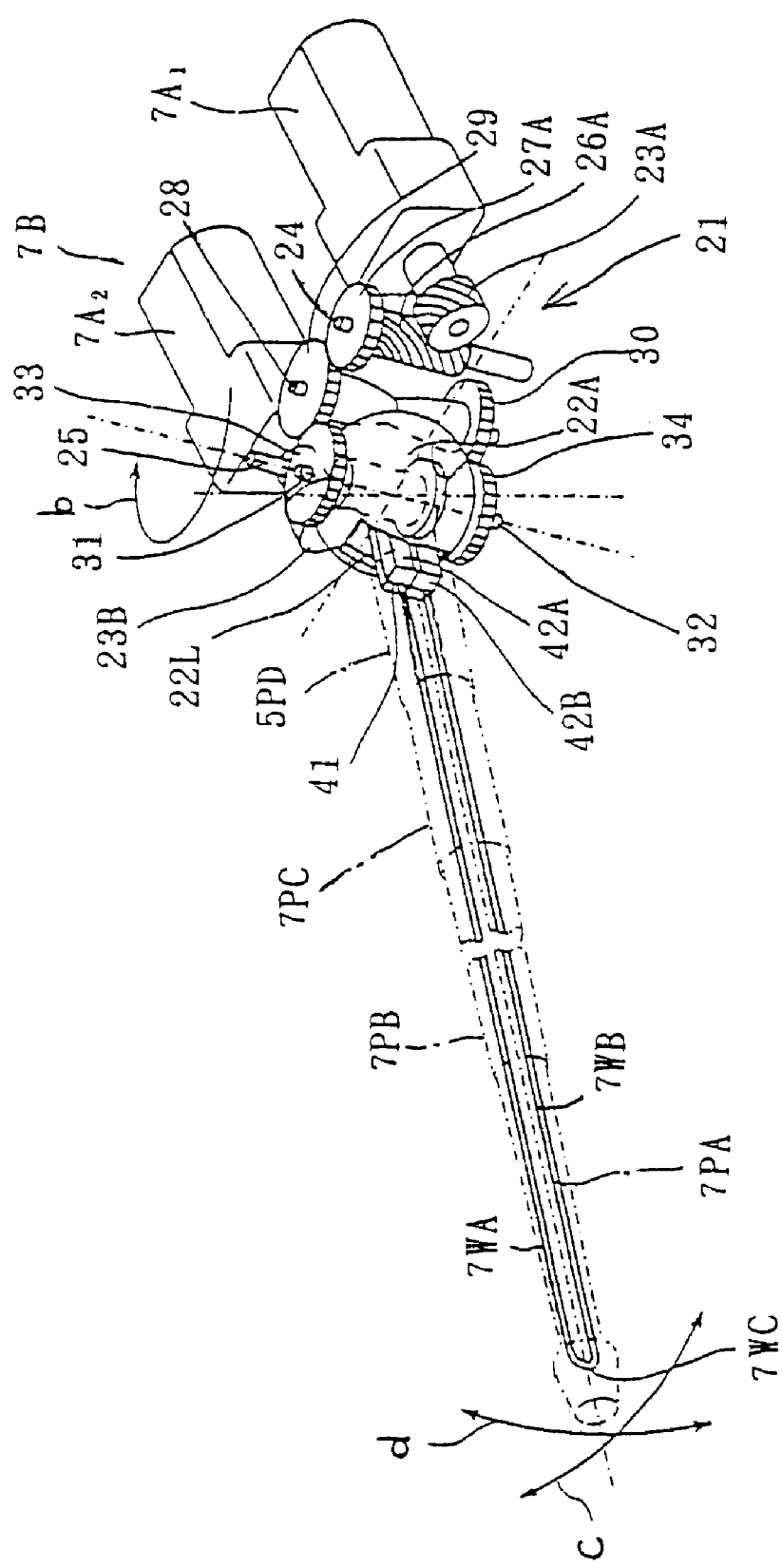
FIG. 10 is a schematic perspective view showing the general structure of the tail unit.

In this manner, in the tail unit 7, as shown in FIG. 10, when the pair of actuators $7A_1$ and $7A_2$ are drive-controlled so that the output shafts $7A_{1X}$ and $7A_{2X}$ are rotated in the mutually same direction at the same rotating speed, the gearbox 22 and the inside differential gear mechanism 35 are rotated in a desired direction according to the above drive control. Thereby, the tail part 7T can be bent in an arrow "c" direction or the inverse lateral direction, or an arrow "d" direction or the vertical direction inverse to that, or the like at a desired amplitude, or can be shaken in the lateral direction at a desired amplitude and speed.

(4) Processing by Controller 10

Here, processing by the controller 10 when in generating a motion of such pet robot 1 will be described.

Figure 11:
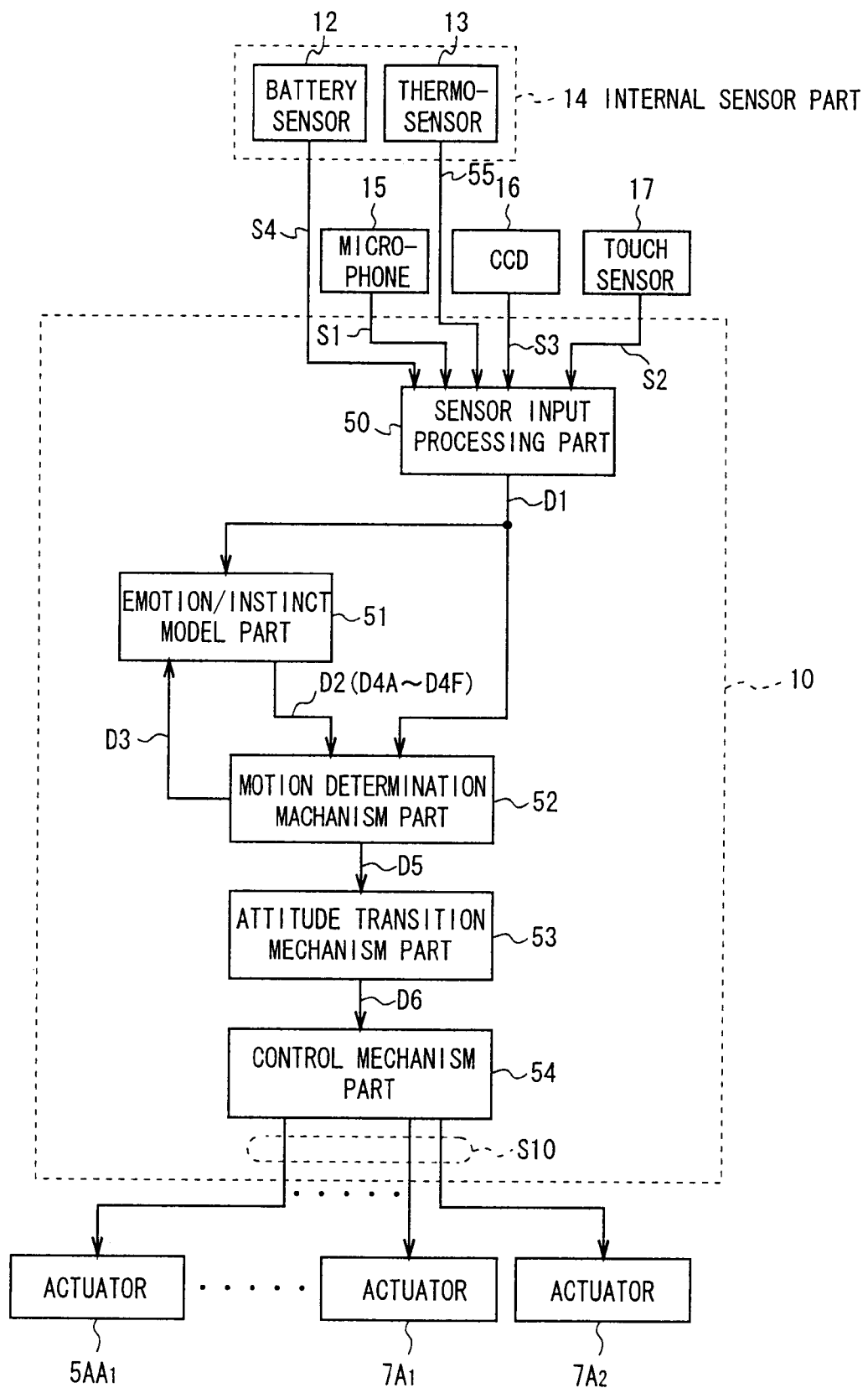
FIG. 11 is a schematic diagram for explaining data processing by a controller.

As shown in FIG. 11, if dividing the content of the processing by the controller 10 when in generating a motion of the pet robot 2 according to function, it can be divided into a sensor input processing part 50 for recognizing a specified external state, an emotion/instinct model part 51 for representing the state of emotion and instinct by accumulating the recognition result by the above sensor input processing part 50, a motion determination mechanism part 52 for determining the following motion based on the recognition result by the above sensor input processing part 50, an attitude transition mechanism part 53 for making the pet robot 2 practically appear a motion based on the determined result by the above motion determining mechanism part 52 and the representation result by the above emotion/instinct model part 51 and a control mechanism part 54 for drive-controlling each of the actuators $5AA_1$ to $7A_1$ and $7A_2$.

In this case, the sensor input processing part 50 detects and recognizes the specified external state, specified approaches from the user and instructions from the user based on the voice signal S1, the image signal S2 and the pressure detection signal S3 supplied from the microphones 15, the CCD camera 16 and the touch sensor 17. Thereafter, the sensor input processing part 50 converts the above recognition results into a hearing state, a visual state and a perception state that true animals feel. At the same time, it recognizes the state of remaining amount of the battery 11 and the internal temperature of the pet robot 2 based on the remaining amount of battery detection signal S4 and the heat detection signal S5 supplied from the battery sensor 12 and the thermosensor 13 forming the internal sensor part 14. Thus obtained state recognition information D1 is informed the emotion/instinct model part 51 and the motion determining mechanism part 52.

Concretely, the sensor input processing part 50 monitors the voice signal S1 supplied from the microphones 15 at all times. And when a spectrum having the same musical scale as a command sound that is supplied from a sound commander (not shown) is detected according to a command such as "walk." "lie down." "follow the ball.", etc. as a spectrum of the above voice signal S1, it recognizes that the command has given, and informing the emotion/instinct model part 51 and the motion determining mechanism part 52 the above recognition result.

The sensor input processing part 50 monitors the image signal S2 supplied from the CCD camera 16 at all times. And when for example "a red round object" or "a level perpendicular to the ground and being a predetermined height or more" has detected in an image based on the image signal S2, it recognizes that "there is a ball.", "there is a wall.", and informing the emotion/instinct model part 51 and the motion determining mechanism part 52 the above recognition result.

The sensor input processing part 50 monitors the pressure detection signal S3 supplied from the touch sensor 17 at all times. And when a pressure at a predetermined threshold value or more and in a short period (e.g. less than 2 minute) has detected based on the above pressure detection signal S3, it recognizes that the pet robot 2 was "slapped (scolded) ". When a pressure at less than the predetermined threshold value and for a long period (e.g. 2 seconds or more) has detected based on the above pressure detection signal S3, it recognizes that the pet robot 2 was stroked (praised)", and informing the emotion/instinct model part 51 and the motion determining mechanism part 52 the recognition result.

The sensor input processing part 50 monitors the remaining amount of battery detection signal S4 supplied from the battery sensor 12 at all times to recognize whether the remaining amount of the battery 11 is 80[%] and over, 50 to 25[%], 25 to 20[%] or 20[%] or below based on the above remaining amount of battery detection signal S4, and informing the emotion/instinct model part 51 and the motion determining mechanism part 52 the above recognition result.

Furthermore, the sensor input processing part 50 monitors the heat detection signal S5 supplied from the thermosensor 13 at all times. And when that the internal temperature of the pet robot 2 is a prescribed critical temperature and over has detected based on the above heat detection signal S5, it recognizes "it is critical", and informing the emotion/instinct model part 51 and the motion determining mechanism part 52 the above recognition result.

Figure 12:
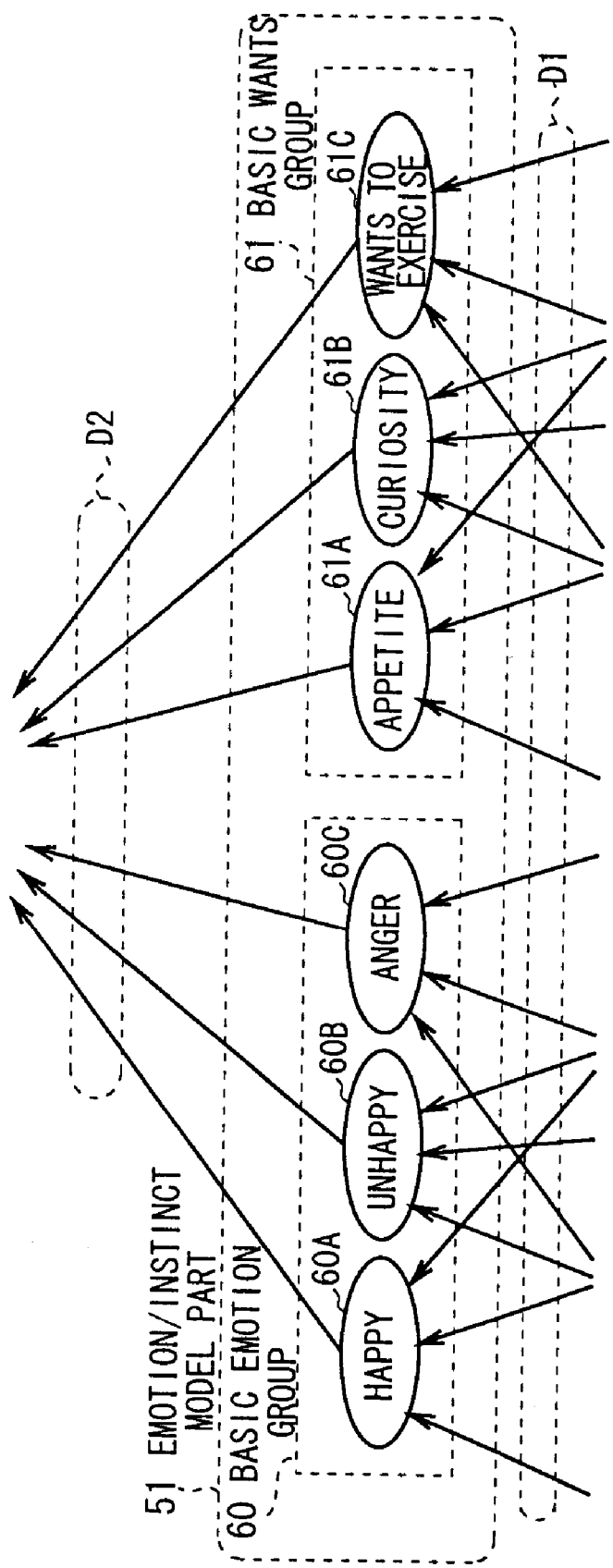
FIG. 12 is a schematic diagram for explaining data processing by an emotion/instinct model part.

As shown in FIG. 12, the emotion/instinct model part 51 has control parameters on a basic emotion group 60 composed of emotion units 60A to 60D as plural independent emotion models and a basic wants group 61 composed of wants units 61A to 61D as plural independent wants models in the memory 10A of the controller 10.

In the basic emotion group 60, the emotion unit 60A shows an emotion "be glad", the emotion unit 60B shows an emotion "be sad", and the emotion unit 60C shows an emotion "be angry".

The emotion units 60A to 60D respectively represent the degree of emotion by for example intensity in levels 0 to 100. The intensity of the emotions respectively changes every moment based on the state recognition information D1 to be supplied. The emotion/instinct model part 51 combines the intensity of the emotion units 60A to 60D changing every moment, and representing the state of emotion of the pet robot 2 and modeling the temporal change of its emotion.

On the other hand, in the basic wants group 61, the wants unit 61A shows wants of "appetite", the wants unit 61B shows wants of "curiosity", and the wants unit 61C shows wants for "exercise".

Similarly to the emotion units 60A to 60D, the wants units 61A to 61D respectively represent the degree of wants by for example intensity in levels 0 to 100. The intensity of wants respective changes every moment based on the state recognition information D1 to be supplied. The emotion/instinct model part 51 combines the intensity of the wants units 61A to 61D changing every moment, and representing the state of instinct of the pet robot 2 and modeling the temporal change of its instinct.

In this manner, the emotion/instinct model part 51 changes respectively the intensity of the emotion units 60A to 60D and the wants units 61A to 61D based on the state recognition information D1. Then, the emotion/instinct model part 51 accumulatively combines thus changed intensity of the emotion units 60A to 60D and determining a state of emotion, and accumulatively combines thus changed intensity of the wants units 61A to 61D and determining a state of instinct. The above determined states of emotion and instinct are transmitted to the motion determining mechanism part 52 as emotion/instinct state information D2.

By the way, the emotion/instinct model part 51 mutually inhivitively or mutually stimulatively combines desired two of the emotion units 60A to 60D in the basic emotion group 60. If the intensity of one of the above combined emotion units 60A to 60D is changed, the intensity of the other emotion unit is changed corresponding to this. Thus, a pet robot having natural emotion will be accomplished.

Figure 13:
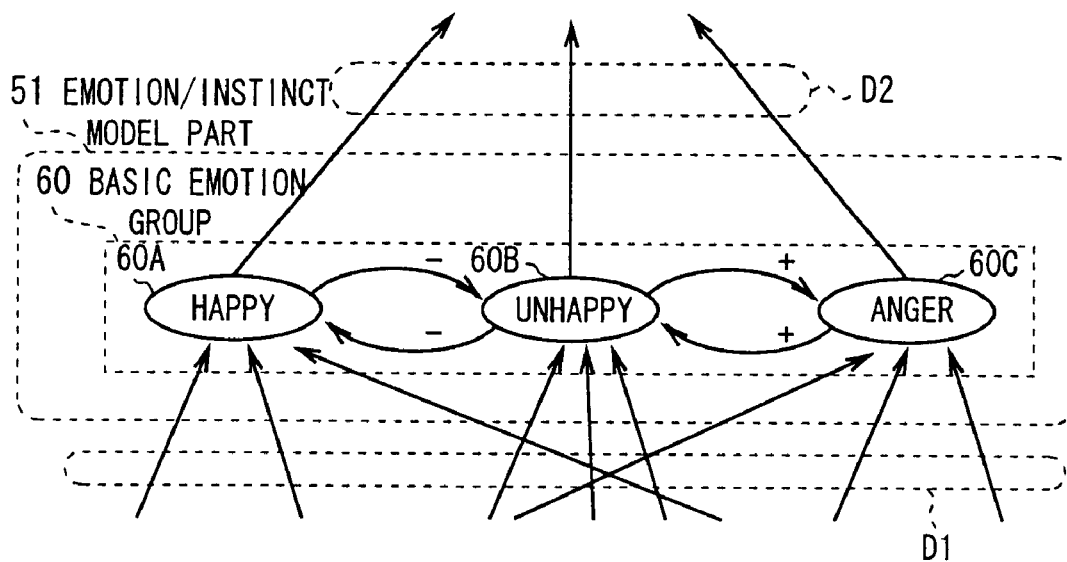
FIG. 13 is a schematic diagram for explaining data processing by the emotion/instinct model part.

That is, as shown in FIG. 13, by mutually inhivitively combining the "glad" emotion unit 60A with the "sad" emotion unit 60B, when the pet robot 2 has praised by the user, the emotion/instinct model part 51 increases the intensity of the "glad" emotion unit 60A. And at the time, even if the state recognition information D1 that changes the intensity of the "sad" emotion unit 60B was not supplied, the emotion/instinct model part 51 naturally decreases the intensity of the "sad" emotion unit 60B corresponding to the increase of the intensity of the "glad" emotion unit 60A. Similarly, if the intensity of the "sad" emotion unit 60B is increased, the emotion/instinct model part 51 naturally decreases the intensity of the "glad" emotion unit 60A corresponding to the increase of the intensity of the above "sad" emotion unit 60B.

On the other hand, by mutually stimulatively combining the "sad" emotion unit 60B with the "angry" emotion unit 60C, when the pet robot 2 has slapped by the user, the emotion/instinct model part 51 increases the intensity of the "angry" emotion unit 60C. And at the time, even if the state recognition information D1 that changes the intensity of the "sad" emotion unit 60B was not supplied, the emotion/instinct model part 51 naturally increases the intensity of the "sad" emotion unit 60B corresponding to the increase of the intensity of the "angry" emotion unit 60C. Similarly, if the intensity of the "sad" emotion unit 60B is increased, the emotion/instinct model part 51 naturally increases the intensity of the "angry" emotion unit 60C corresponding to the increase of the intensity of the above "sad" emotion unit 60B.

Furthermore, similarly to the case of combining two of the emotion units 60A to 60C, if the emotion/instinct model part 51 mutually inhivitively or mutually stimulatively combines desired two of the wants unit 61A to 61C in the basic wants group 61 and one of the above combined wants units 61A to 61C is increased, the intensity of the other wants unit changes corresponding to this. Thus, a pet robot 2 having natural instinct will be accomplished.

Figure 14:
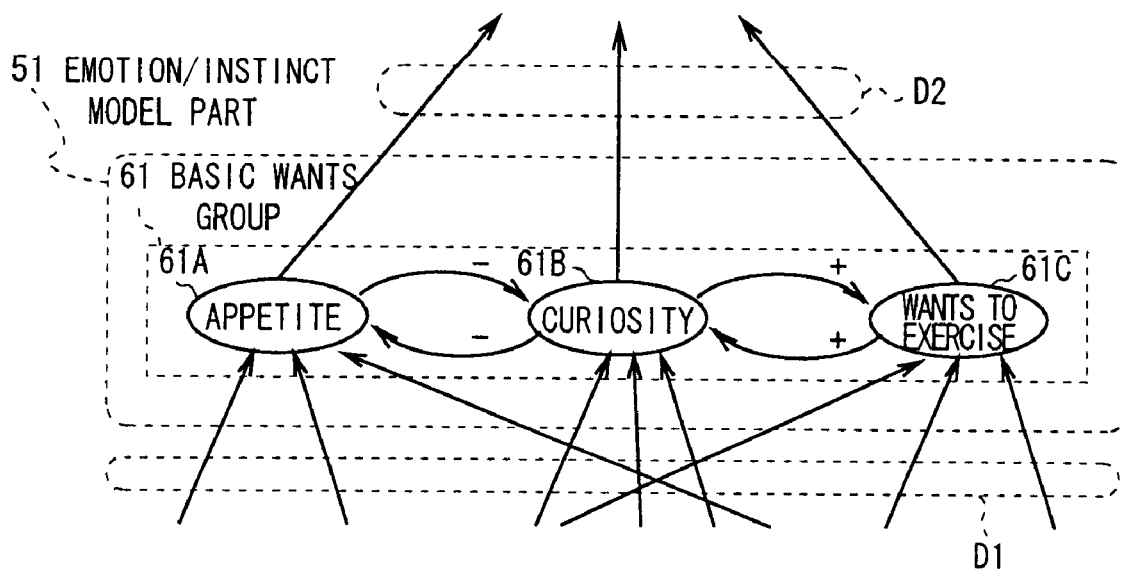
FIG. 14 is a schematic diagram for explaining data processing by the emotion/instinct model part.

That is, as shown in FIG. 14, by mutually inhivitively combining the "appetite" wants unit 61A with the "exercise" wants unit 61B, when the remaining amount of the battery 11 inside the pet robot 2 is less, the emotion/instinct model part 51 increases the intensity of the "appetite" wants unit 61A. And at the time, even if the state recognition information D1 that changes the intensity of the "exercise" wants unit 61B was not supplied, the emotion/instinct model part 51 naturally decreases the intensity of the "exercise" wants unit 61B corresponding to the increase of the "appetite" wants unit 61A. Similarly, if the intensity of the "exercise" wants unit 61B is increased, the emotion/instinct model part 51 naturally decreases the intensity of the "appetite" wants unit 61A corresponding to the increase of the intensity of the above "exercise" wants unit 61B.

On the other hand, by mutually stimulatively combining the "curiosity" wants unit 61B with the "exercise" wants unit 61C, when the pet robot 2 had not been moved in a predetermined time, the emotion/instinct model part 51 increases the intensity of the "exercise" wants unit 61C. And at the time, even if the state recognition information D1 that changes the intensity of the "curiosity" wants unit 61B was not supplied, the emotion/instinct model part 51 naturally increases the intensity of the "curiosity" wants unit 61B corresponding to the increase of the intensity of the "exercise" wants unit 61C. Similarly, if the intensity of the "curiosity" wants unit 61B is increased, the emotion/instinct model part 51 naturally increases the intensity of the "exercise" wants unit 61C corresponding to the increase of the intensity of the above "curiosity" wants unit 61B.

Referring to FIG. 11, to the emotion/instinct model part 51, motion information D3 which shows the content of the present or the past motion of the pet robot 2 itself, for example a motion such as "it walked for a long time." will be supplied from the motion determining mechanism part 52 in the following stage. Thereby, even if the same state recognition information D1 has given, different emotion/instinct state information D2 will be generated according to the motion of the pet robot 2 shown by the above motion information D3.

Figure 15:
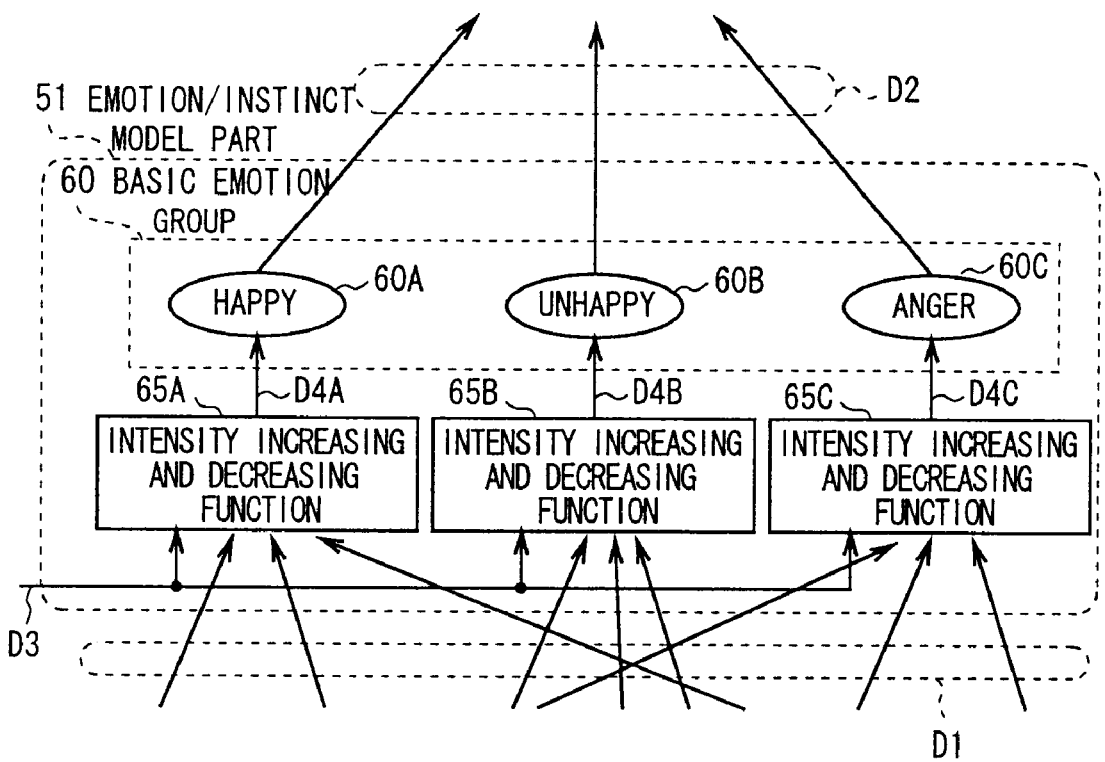
FIG. 15 is a schematic diagram for explaining data processing by the emotion/instinct model part.

Concretely, as shown in FIG. 15, in the emotion/instinct model part 51, in the preceding stage of the emotion units 60A to 60C, intensity increasing/decreasing functions 65A to 65C for generating intensity information D4A to D4C for increasing/decreasing the intensity of the emotion units 60A to 60C based on the motion information D3 showing the motion of the pet robot 2 and the state recognition information D1 have been respectively provided. They respectively increase/decrease the intensity of the emotion units 60A to 60C corresponding to the intensity information D4A to D4C supplied from the above intensity increasing/decreasing functions 65A to 65C.

For instance, if the head is stroked by the user when the pet robot 2 greeted the user, that is, if the motion information D3 showing that it greeted the user and the state recognition information D1 showing that the head was stroked are given to the intensity increasing/decreasing function 65A, the emotion/instinct model part 51 increases the intensity of the "glad" emotion unit 60A. On the other hand, however, even if the head was stroked when it is executing some job, that is, even if the motion information D3 showing that it is executing a job and the state recognition information D1 showing that the head was stroked are given to the intensity increasing/decreasing function 65A, the emotion/instinct model part 51 does not change the intensity of the "glad" emotion unit 60A.

In this manner, the emotion/instinct model part 51 determines the intensity of each emotion unit 60A to 60C while referring to not only the state recognition information D1 but also the motion information D3 showing the present or the past motion of the pet robot 2. Thereby, that the pet robot 2 appears unnatural emotion like that for example in the case where the user stroked its head with the intention of playing a prank on it when it is executing some job, the intensity of the "glad" emotion unit 60A is increased, can be avoided.

In this connection, also in case of the wants units 61A to 61C, similarly, the emotion/instinct model part 51 respectively increases/decreases the intensity of the wants units 61A to 61C based on the state recognition information D1 and the motion information D3 to be supplied.

Figure 16:
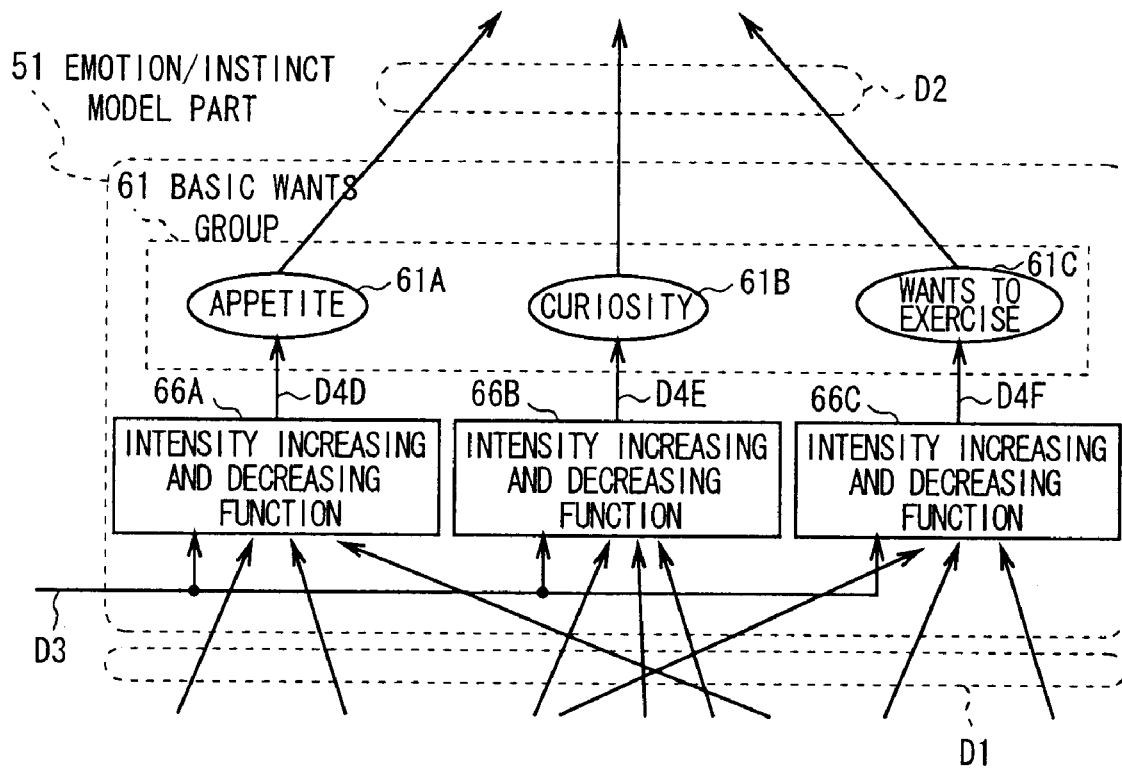
FIG. 16 is a schematic diagram for explaining data processing by the emotion/instinct model part.

Concretely, as shown in FIG. 16, in the emotion/instinct model part 51, in the preceding stage of each wants unit 61A to 61C, intensity increasing/decreasing functions 66A to 66C for generating intensity information D4D to D4F for increasing/decreasing the intensity of each of the wants units 61A to 61C based on the motion information D3 showing a motion of the pet robot 2 and the state recognition information D1 have been respectively provided. And they respectively increase/decrease the intensity of each of the wants units 61A to 61C corresponding to the intensity information D4D to D4F supplied from the above intensity increasing/decreasing functions 66A to 66C.

For instance, if the motion information D3 showing that it is seeing an object in its liking color and the state recognition information D1 showing that it has not been moved for a period of time are given to the intensity increasing/decreasing function 66A, the emotion/instinct model part 51 increases the intensity of the "curiosity" wants unit 61B. On the other hand, however, even if the motion information D3 showing that it is in immediately after walked around and it is resting and the state recognition information D1 showing that it has not been moved for a period of time in an environment that there is nothing to be interesting are given to the intensity increasing/decreasing function 65A, the emotion/instinct model part 51 does not change the intensity of the "curiosity" wants unit 61B.

In this manner, the emotion/instinct model part 51 determines the intensity of each wants unit 61A to 61C while referring to not only the state recognition information D1 but also the motion information D3 showing the present or the past motion of the pet robot 2. Thereby, that the pet robot 2 appears unnatural instinct like that for example when it saw an object in its liking color when it is tired to walk and resting, the intensity of the "curiosity" wants unit 61B is increased, can be avoided.

As described above, the intensity increasing/decreasing functions 65A to 65C, 66A to 66C are functions that if the state recognition information D1 and the motion information D3 are entered, the intensity information D4A to D4F are generated and transmitted according to a parameter previously set. By setting the above parameter to a different value to every pet robot 2, the above pet robot 2 can have individuality as for example a quick-tempered pet robot 2 or a cheerful pet robot 2 or the like.

Referring to FIG. 11, the motion determining mechanism part 52 determines the next motion based on the state recognition information D1 and the emotion/instinct state information D2, and transmits the content of the above determined motion to the attitude transition mechanism part 53 as motion command information D5.

Figure 17:
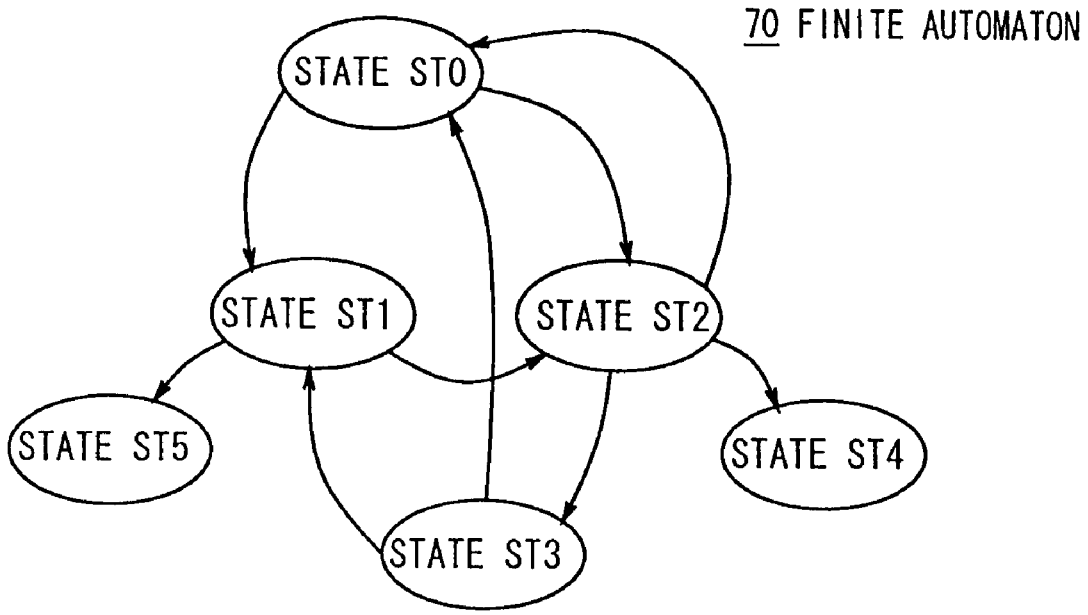
FIG. 17 is the state transition view of finite automaton in a motion determination mechanism part.

Concretely, as shown in FIG. 17, the motion determining mechanism part 52 adopts an algorithm called a finite automaton 70 that has finite number of states in which the history of the state recognition information D1 supplied in the past is represented by a motion state (hereinafter, this is referred to as state) and the above state is changed to another state based on the state recognition information D1 presently supplied and a state at that time so that the next motion is determined. In this manner, the motion determining mechanism part 52 changes the state every time when the state recognition information D1 is supplied, and determining a motion according to the above changed state. Therefore, the motion will be determined with reference to not only the present state recognition information D1 but also the past state recognition information D1.

Accordingly, for example in a state ST1 that "it is following a ball.", if the state recognition information D1 showing that "it had lost sight of the ball." is supplied, it shifts to a state ST5 that "it is standing.". On the other hand, in a state ST2 that "it is lying down.", if the state recognition information D1 showing that "get up." is supplied, it shifts to a state ST4 that "it is standing.". In this manner, between these state ST4 and state ST5, the motion is identical but the history of the past state recognition information D1 is different. Thus, it is found that also the state is different between them.

Practically, if a prescribed trigger is detected, the motion determining mechanism part 52 makes a transition from the present state to the next state. As a concrete example of the trigger, for example that the executing time of the motion of the present state has reached to a prescribed value, or that the intensity of specified state recognition information D1, or the intensity of a desired unit in the emotion units 60A to 60C and the wants units 61A to 61C shown by the emotion/instinct state information D2 supplied from the emotion/instinct model part 51 has exceeded a prescribed threshold value or the like can be given.

At the time, the motion determining mechanism part 52 selects a state at the destination of transition based on whether or not the intensity of the desired unit in the emotion units 60A to 60C and the wants units 61A to 61C shown by the emotion/instinct state information D2 supplied from the emotion/instinct model part 51 exceeds the prescribed threshold value. Therefore, even if for example the same state recognition information D1 has entered, the motion determining mechanism part 52 makes a transition to a different state according to the intensity of the emotion units 60A to 60C and the wants units 61A to 61C.

Accordingly, if the motion determining mechanism part 52 detects for example that a palm was held out to right in front of it based on the supplied state recognition information D1, that the intensity of the "angry" emotion unit 60C is the prescribed threshold value or below based on the emotion/instinct state information D2, and that "it is not hungry." that is, the battery voltage is the prescribed threshold value or more by the state recognition information D1, the motion determining mechanism part 52 generates the motion command information D5 to make the pet robot 2 perform a motion of "give me a hand." responding to that the palm has held out to right in front of it, and transmitting this to the attitude transition mechanism part 53.

If detecting for example that a palm was held out to right in front of it, that the intensity of the "angry" emotion unit 60C is the prescribed threshold value or below, and that "it is hungry.", that is, the battery voltage is below the prescribed threshold value, the motion determining mechanism part 52 generates motion command information D5 to make the pet robot 2 perform a motion as if "it licks the palm", and transmitting this to the attitude transition mechanism part 53.

If detecting for example that a palm was held out to right in front of it and the intensity of the "angry" emotion unit 60C is the prescribed threshold value and over, the motion determining mechanism part 52 generates motion command information D5 to make the pet robot 2 perform a motion that "it looks away in anger" whether "it is not hungry." or not, that is, whether the battery voltage is the prescribed threshold value and below or not, and transmitting this to the attitude transition mechanism part 53.

Furthermore, if detecting for example that the remaining amount of the battery 11 is the prescribed threshold value or below based on the supplied state recognition information D1, and that the intensity of the "appetite" wants unit 61A is the prescribed threshold value and over based on the emotion/instinct state information D2, the motion determining mechanism part 52 generates motion command information D5 to make the pet robot 2 perform a motion "to urge the user its battery charging", and transmitting this to the attitude transition mechanism part 53.

By the way, the motion determining mechanism part 52 determines the parameter of a motion to be performed in the state at the destination of transition, e.g. walking speed, the size and the speed of a motion when its legs are moved, the tone and the volume of a sound when sound is generated, etc., based on the intensity of the desired unit in the intensity of the emotion units 60A to 60C and the wants units 61A to 61C shown by the emotion/instinct state information D2 supplied from the emotion/instinct model part 51, and generating motion command information D3 according to the above parameter of motion, and transmitting this to the attitude transition mechanism part 53.

In this connection, the state recognition information D1 to be supplied from the sensor input processing part 50 is different in the content of information depending on the timing transmitted to the emotion/instinct model part 51 and the motion determining mechanism part 52. Therefore, it also will be supplied to the motion determining mechanism part 52 as well as the emotion/instinct model part 51.

For instance, if the state recognition information D1 that "the head was stroked." is supplied, the controller 10 generates emotion/instinct state information D2 showing that "it is glad." by the emotion/instinct model part 51, and supplying the above emotion/instinct state information D2 to the motion determining mechanism part 52. In this state, however, if the state recognition information D1 showing that "there is a palm right in front of it." is supplied, the controller 10 generates motion command information D5 showing that "it cheerfully gives a hand." in the motion determining mechanism part 52 based on the aforementioned emotion/instinct state information D2 showing that "it is glad." and the state recognition information D1 showing that "there is a hand right in front of it.", and transmitting this to the attitude transition mechanism part 53.

On the other hand, for instance, if state recognition information D1 showing that "there is almost no remaining amount of the battery 11." is supplied, the controller 10 generates emotion/instinct state information D2 showing that "it is hungry." by the emotion/instinct model part 51, and supplying the above emotion/instinct state information D2 to the motion determining mechanism part 52. In this state, however, if state recognition information D1 showing that "the internal temperature of the pet robot 2 is abnormally high." is supplied, the controller 10 makes motion determining mechanism part 52 generate motion command information D5 showing that "it appeals that by standing up." based on the aforementioned emotion/instinct state information D2 showing that "it is hungry." and state recognition information D1 showing that "it wants to be cooled.", and transmitting this to the attitude transition mechanism part 53.

Referring to FIG. 11, the attitude transition mechanism part 53 generates attitude transition information D6 to make a transition from the present attitude to the next attitude based on the motion command information D5 supplied from the motion determining mechanism part 52, and transmitting this to the control mechanism part 54. In this case, the next attitude to which a transition can be made from the present attitude is determined based on the physical shape of the pet robot 2 such as the shape of the body and the legs, its weight, combined state between each of the parts, etc., and the mechanism of the actuators $5AA_1$ to $7A_1$ and $7A_2$ such as the directions and the angles when the joints bent.

By the way, such attitudes to which a transition can be made will be classified into attitudes to which a direct transition can be made from the present attitude and not. For instance, the four pedalism pet robot 2 can directly make a transition to a state lying face down from a state lying down while stretching out its legs. However, it cannot be directly made a transition to a standing state. It needs two step motion that once the pet robot 2 shifts to an attitude of lying down while pulling its legs near the body and then standing up. Furthermore, there is an attitude that cannot be safely executed. For example, it is the case where if the four pedalism pet robot tries to a motion of banzai by raising both forelegs, it easily falls down.

Therefore, in the attitude transition mechanism part 53, the attitudes to which a transition can be made have been previously registered. And in the case where the motion command information D5 supplied from the motion determining mechanism part 52 shows an attitude to which a transition can be directly made, the above motion command information D5 is transmitted to the control mechanism part 54 as attitude transition information D6 as it is. On the other hand, in the case where it shows an attitude to which a transition cannot be directly made, the attitude transition mechanism part 53 generates attitude transition information D6 that makes a transition once to another attitude to which a transition can be made and then makes a transition to the aimed attitude, and transmitting this to the control mechanism part 54. Thereby, the pet robot 2 can avoid the situation that it tries to forcibly execute an attitude to which a transition cannot be made or the situation that it falls down.

Concretely, in the attitude transition mechanism part 53, the attitudes that the pet robot 2 can take have been previously registered, and at the same time, a motion between two of the attitudes to which a transition can be made has been recorded.

Figure 18:
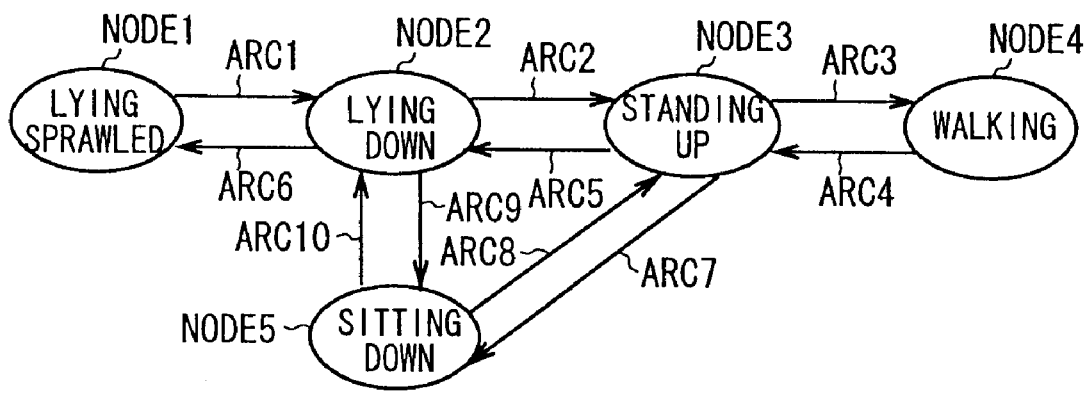
FIG. 18 is an attitude transition view in an attitude transition mechanism part.

For instance, as shown in FIG. 18, the attitude transition mechanism part 53 adopts an algorithm called a directed graph 80 in which the attitudes that can be taken by the pet robot 2 have been represented as nodes NODE1 to NODE5 and between two of the attitudes to which a transition can be made, that is, between the nodes NODE1 to NODE 5 will be connected by directed arcs ARC1 to ARC10.

If the motion command information D5 is supplied from the motion determining mechanism part 52, the attitude transition mechanism part 53 plans attitude transition by searching for a route to get to the next node NODE from the present node NODE according to the direction of the directed arcs ARCs so as to connect the node NODE corresponding to the present attitude with the next node NODE corresponding to the attitude to be nextly taken shown by the motion command information D5, and recording nodes NODEs on the above searched route in order. Thereby, the pet robot 2 can realize a motion instructed by the motion determining mechanism part 52 while avoiding the situation that an attitude to which a transition cannot be made is forcibly executed or the situation that it falls down.

For example, when the present attitude is at the node NODE2 that shows an attitude "lying down", if motion command information D5 that means "sit down." is supplied, the attitude transition mechanism part 53 gives attitude transition information D6 that shows "sit down." to the control mechanism part 54 by utilizing that a transition can be directly made from the node NODE2 that shows an attitude "lying down" to the node NODE5 that shows the attitude "sitting down".

On the contrary, if motion command information D5 that means "walk." is supplied, the attitude transition mechanism part 53 plans attitude transition by searching for a route from the node showing "lying down" NODE2 to the node showing "walking" NODE4. As a result, the attitude transition mechanism part 53 generates attitude transition information D6 that makes an instruction of "stand up." and then makes an instruction of "walk.", and transmitting this to the control mechanism part 54.

Referring to FIG. 11, the control mechanism part 54 generates a control signal S10 to make drive the actuators $5AA_1$ to $7A_1$ and $7A_2$ based on the attitude transition information D6, and transmitting this to the actuators $5AA_1$ to $7A_1$ and $7A_2$ and driving the above actuators $5AA_1$ to $7A_1$ and $7A_2$, to make the pet robot 2 perform a desired motion.

(5) Battery Charging Request Processing Procedure RT1

Figure 19:
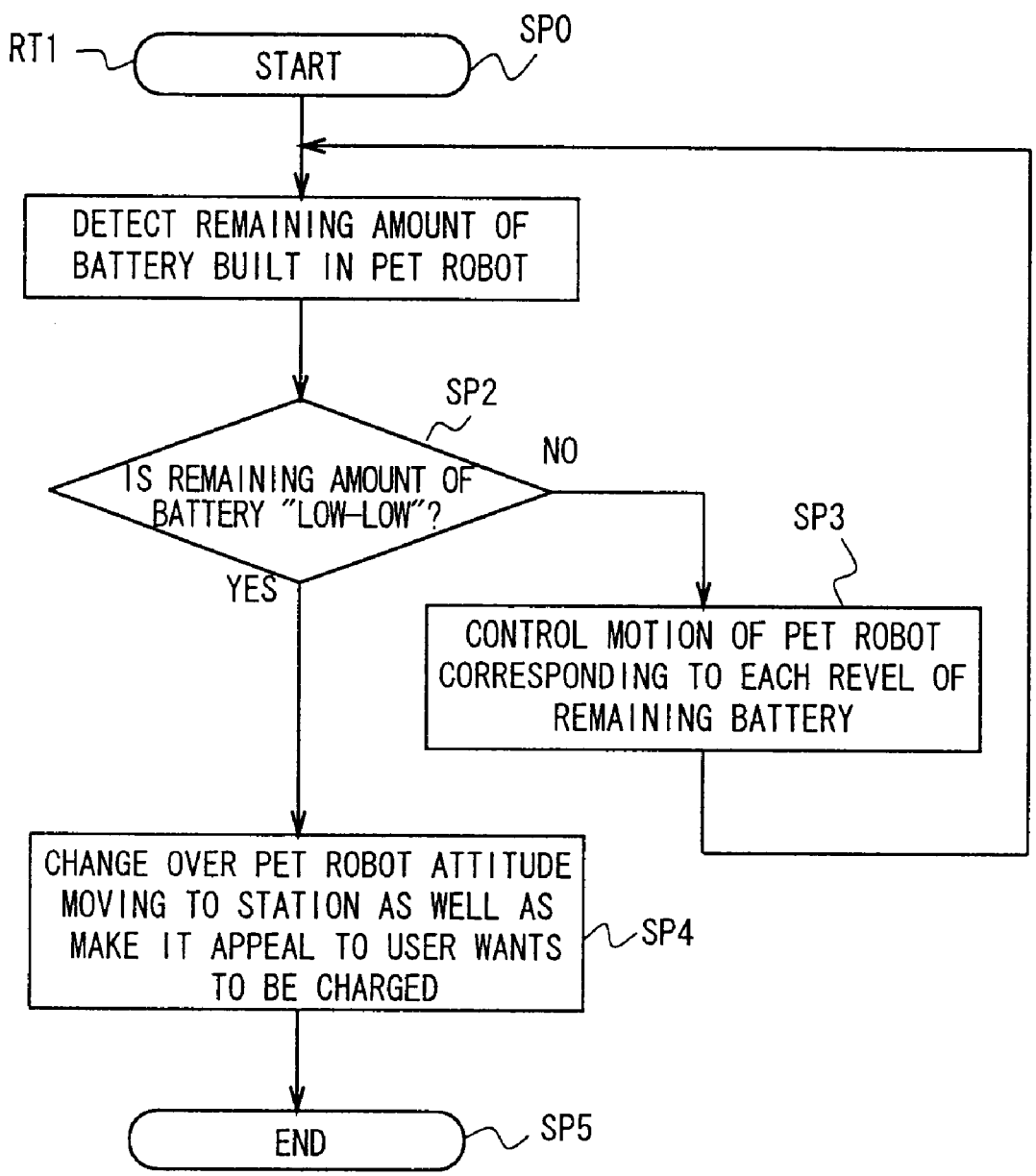
FIG. 19 is a flowchart for explaining battery charging request processing procedure.

Practically, when in operating, the controller 10 in this pet robot 2 enters battery charging request processing procedure RT1 shown in FIG. 19 from step SP0. In the following step SP1, the controller 10 makes the battery sensor 12 detect the remaining amount of the battery 11 built in the pet robot 2.

Then, the controller 10 proceeds to step SP2 to determine whether or not the remaining amount of the battery 11 is "Low-Low" being 20[%] or below. In this step SP2, if a negative result is obtained, this means that the remaining amount of the battery 11 is one of "Full" being 80[%] and over, "Middle-Full" being 80 to 50[%], "Middle" being 50 to 25[%] or "Low" being 25 to 20[%]. At this time, the controller 10 controls the motion of the pet robot 2 according to the respective levels of the remaining amount of the battery 11, and then returns to step SP1 again.

In this case, when the remaining amount of the battery 11 is "Full" being 80[%] and over, the controller 10 controls a walking step and a speed to be relatively large. And as the remaining amount of the battery 11 becomes 80 to 20[%], that is, becomes "Low" from the "Middle-Full" passing "Middle", the controller 10 controls each of the units 5A to 5D, 6 and 7 so as to reduce the moving amount of the pet robot 2 as the remaining amount reduces. On the contrary, if a negative result is obtained in step SP2, the controller 10 proceeds to step SP4 to change the pet robot 2 to the aforementioned attitude to move to the station and appeal to the user wants for battery charging. Thereafter, the controller 10 proceeds to step SP5 and finishing the above battery charging request processing procedure RT1.

Concretely, the controller 10 drive-controls each of the leg units 5A to 5D so that the pet robot 2 is in the attitude to move to the station as well as drive-controls the tail unit 7 to shake the tail part in the specified direction, at a specified amplitude and speed and drive-controls the head unit 6 to make the LED provided at the position of "eye" turn on and off in a prescribed light emitting pattern. And at the same time, the controller 10 makes generating prescribed warning sound (e.g. "I'm hungry." or the like) from the speaker 18 built-in at the position of "ear".

(6) Internal Temperature Control Processing Procedure RT2

Figure 20:
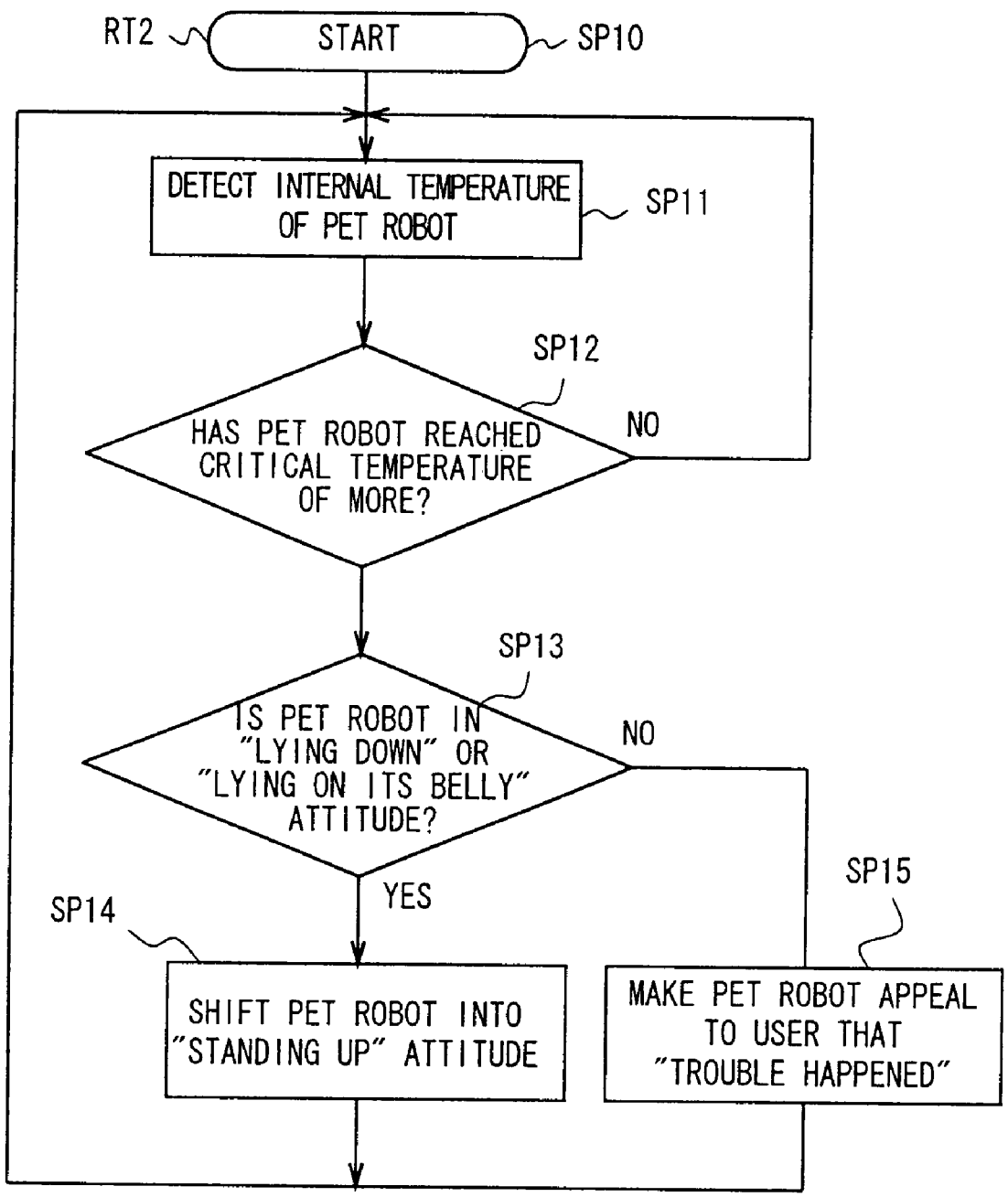
FIG. 20 is a flowchart for explaining internal temperature control processing procedure.

Practically, when in operating, the controller 10 in this pet robot 2 enters internal temperature control processing procedure RT2 shown in FIG. 20 from step SP10. In the following step SP11, the controller 10 makes the thermosensor 13 detect the internal temperature of the body unit 4 in the pet robot 2.

Then, the controller 10 proceeds to step SP12 to determine whether or not the internal temperature of the pet robot 2 has reached a prescribed critical temperature (e.g. 60[° C.]: the usable heat-resistance temperature of general storage cells). When a negative result is obtained, it returns to step SP11 again. On the contrary, when an affirmative result is obtained, it proceeds to step SP13.

In this step SP13, the controller 10 determines whether or not the pet robot 2 is presently in an attitude "lying down" or "lying on its belly". When an affirmative result is obtained, the controller 10 proceeds to step SP14 to drive-control each of the leg units 5A to 5D of the pet robot 2 and change over the pet robot 2 to a "standing up" attitude. Thereafter, the controller 10 returns to step SP11 again and repeating the processing similar to the above.

On the contrary, if a negative result is obtained in step SP13, this means that with respect to the pet robot 2, the battery 11 built in the body unit 4 has broken or the exhausting opening 4AX and/or the intake 4BX in a closing state because some object has been stuck to or wound around the above body unit 4. At this time, the controller proceeds to step SP15 to appeal "trouble occurred." to the user, and then, it returns to step SP11 again and repeating the processing similar to the above.

Concretely, the controller 10 drive-controls each of the leg units 5A to 5D and the tail unit 7 so that the pet robot 2 becomes into a standing upright state as well as drive-controls the head unit 6 to make the LED provided at the position of "eye" turn on and off in a specified light emitting pattern. And at the same time, the controller 10 makes generating a predetermined warning sound from the speaker 18 built-in at the position of "ear".

(7) Operation and Effects of This Embodiment

According to the above configuration, in the pet robot 2, if the user approaches to the pet robot 2 by "slapping" or "stroking" it, or if the user generates a voice such as "walk." or "lay down." by word of mouth or by means of a sound commander, or if an object which has a distinctive feature in color or shape is placed in an area that the pet robot 2 can move, these recognition results will be converted into various emotions that real animals feel.

At this time, in the pet robot 2, each of the actuators $5AA_1$ to $7A_1$ and $7A_2$ of each of the leg units 5A to 5D, the head unit 6 and the tail unit 7 will be drive-controlled according to the intensity of emotions "glad", "sad" and "angry". Thereby, the pet robot 2 performs the same attitude and motion as emotional expression that real animals do.

More particularly, in the tail unit 7 as described above, the tail part 7T connected to the gearbox 22 in the base part 7B can be shaken not only in the vertical and the lateral directions but also in the turning direction, and at the same time, also it can be paused as it is bending in the vertical direction and in a desired state. Accordingly, in the tail unit 7, various emotional expression can be represented based on the shaking or the bending direction of the tail part 7T, its amplitude at shaking and its speed, its standstill position at bending, its instantaneous motion, etc.

For instance, when the pet robot 2 represents "gladness", in the tail unit 7, the tail part 7T will be shaken in the lateral direction at an amplitude and at a speed in proportion to a degree of "gladness". When in representing "sadness", in the tail unit 7, the tail part 7T will be stood still in a state that it is bending to droop in the lower direction. And when in representing "anger", in the tail unit 7, the tail part 7T will be shaken in the vertical direction at an amplitude and at a speed in proportion to the degree of "anger".

Therefore, in this pet robot 2, various emotional expressions can be reflected in the motions and the attitudes of the tail part 7T of the tail unit 7. It can further give the user a sense of affinity or a feeling of satisfaction.

Furthermore, according to the above configuration, in this pet robot system 1, when the pet robot 2 is moving, the remaining amount of the battery 11 built in the body unit 4 will be detected in phased levels. And the motion of each of the units 5A to 5D, 6 and 7 will be controlled so that the amount of motion of the pet robot 2 decreases as the remaining amount reduces to the above each level. Thus, the power consumption of the battery 11 can be saved.

Then when the remaining amount of the battery has reduced to the lowest level, each of the leg units 5A to 5D is drive-controlled and the pet robot 2 is changed to the attitude to move to the station. At the same time, the head unit 6 and/or the tail unit 7 is drive-controlled to make the LED turn on and off in a prescribed light emitting pattern, to generate a prescribed warning sound from the speaker 18, or to shake the tail unit 7 in a specified direction, at a specified amplitude and at a specified speed. Thereby, the pet robot 2 can directly inform the user that there is almost no remaining amount of the battery 11. Therefore, on one hand a manner that the pet robot 2 appeals its appetite as if it is a true animal can be transmitted to the user, on the other hand that the pet robot 2 suddenly stops and gets into a state as if it is dead can be prevented.

Moreover, in this pet robot system 1, when the pet robot 2 is moving, the internal temperature of the body unit 4 will be detected. And if the internal temperature reaches the prescribed critical temperature when the pet robot 2 is presently in the attitude of "lying down" or "lying on its belly", each of the leg units 5A to 5D is drive-controlled and the pet robot 2 is shifted to a "standing up" attitude. Thereby, the pet robot 2 can spontaneously ventilate the internal temperature of the body unit 4. Thus, trouble of the pet robot 2 can be prevented by its own motion.

On the contrary, if the internal temperature reaches the prescribed critical temperature when the pet robot is presently not in the attitude of "lying down" or "lying on its belly", the head unit 6 and/or the tail unit 7 is controlled to make the LED turn on and off in a specified light emitting pattern, a specified warning sound will be generated from the speaker 18, and the tail unit 7 will be shaken in a specified direction at a specified amplitude and at a specified speed. Thereby, that the pet robot 2 is in a critical state can be informed the user directly. Thus, even if the pet robot 2 cannot prevent trouble by its own motion, the possibility of the trouble can be remarkably reduced.

According to the above configuration, in this pet robot 2, after conversion as emotions that true animals based on approaches from a user, command input and the motion of itself, the above emotion will be represented by the motion and the attitude of the tail part 7T in the tail unit 7. Thereby, a sense of affinity and a feeling of satisfaction, etc. can be further given to the user. Thus, the pet robot 2 in which the amusement characteristic can be further improved can be accomplished.

Furthermore, in this pet robot system 1, when the pet robot 2 is moving, if that there is almost no remaining amount of the battery 11 built in the body unit 4 is detected, the pet robot 2 is changed to the attitude to move to the station, and at the same time, the head unit 6 and/or the tail unit 7 is drive-controlled to represent that by its manner, and inform the user that. Thereby, a sense of affinity, a feeling of satisfaction, etc. can be given to the user by its manner appealing appetite as if it is a true animal. Thus, the pet robot system 1 in which its amusement characteristic can be further improved can be accomplished.

Moreover, in this pet robot system 1, when the pet robot 2 is moving, if the internal temperature of the body unit user 4 reaches the prescribed critical temperature, on one hand when the pet robot 2 is presently in the attitude of "lying down" or "lying on its belly", the pet robot 2 is shifted to a "standing up" attitude, on the other hand when it is in the other attitudes, the head unit 6 and/or the tail unit 7 is drive-controlled to represent that by its manner and inform the user that. Thereby, trouble of the battery 11 inside the pet robot 2 can be prevented. Thus, the pet robot system 1 in which its safety can be ensured can be accomplished.

(8) Other Embodiments

In the aforementioned embodiment, it has dealt with the case where as the movable part of which one end has been combined freely in rotation in the direction of at least one axis or more, the tail part 7T of the tail unit 7 in the pet robot 2 is applied. However, the present invention is not only limited to this but also in case of a robot like an insect, a feeler may be applied. The present invention can be widely applied to other movable parts provided that it can perform various motions (such as bending, shaking and/or turning) in the robot.

In the aforementioned embodiment, it has dealt with the case where as the motion control means for operating the tail part 7T of the tail unit 7, the controller 10, the actuators 7A$_1$ and 7A$_2$ in the base part 7B that will be driven according to control by the above controller, and the gear transmission mechanism 21 and the gearbox 22 in the above base part 7B are applied. However, the present invention is not only limited to this but also various configurations can be widely applied other than that.

In this case, it has dealt with the case where the motion control means applies the state recognition information D1 composed of the recognition results by the microphones 15, the CCD camera 16 and the touch sensor 17 as input information to determine the motion of the tail part 7T. However, the present invention is not only limited to this but also approach information from the user, environment information around the pet robot 2 may be applied as the input information other than that.

Furthermore, in the aforementioned embodiment, it has dealt with the case where as the emotion/instinct model changing means for determining the motion of the tail part 7T in the tail unit 7 by changing the emotion/instinct model, the controller 10 and the memory 10A provided in the body unit 4 are applied. However, the present invention is not only limited to this but also various configurations can be widely applied other than that.

Moreover, in the aforementioned embodiment, it has dealt with the case where as the emotional expression by the motion and attitude of the tail part 5T in the tail unit 5, only three kinds of expression "glad", "sad" and "angry" have been applied. However, the present invention is not only limited to this but also it can be applied to various emotional expressions such as "surprise", "scare", "dislike" etc.

In this case, emotion units showing the emotions such as "surprise", "scare" and "dislike" may be added to the emotion units 60A to 60C forming the basic emotion group 60 described above with reference to FIG. 12. Thereby, for example when the pet robot 2 represents "surprise", in the tail unit 7, the tail part 7T may be only instantaneously shaken in the lateral or vertical direction at an amplitude in proportion to the degree of "surprise". When in representing "scare", in the tail unit 7, the tail part 7T may be stood still in the state where it is straight in the horizontal direction. And when in representing "dislike", in the tail unit 7, the tail part 7T may be turned at an amplitude and at a speed in relation to the degree of "dislike".

Furthermore, without only limiting to the emotional expression, it may be applied to instinctive expression. In this case, for example when in representing "hungry" or "sleepy", the tail part 7T may be changed to the same attitude as "sad" described above. Oppositely, when in representing "full" or "wants for exercise", the tail part 7T may be moved in relation to the degree in the same manner as "glad" described above.

Moreover, as emotional expression by the tail part 7T, if shaking it in a predetermined motion pattern in synchronization with a generated sound from the speaker 18 or the light emitting pattern of the LED (not shown) that corresponds to "eye" in the head unit 6, power of expression of the pet robot 2 can be further increased.

Furthermore, in the aforementioned embodiment, it has dealt with the case where as contents represented by the motion and attitude of the tail part 7T in the tail unit 7, determined various emotional expressions of real animals that will be determined using the microphones 15, the CCD camera 16 and the touch sensor 17 are applied. However, the present invention is not only limited to this but also it may be applied to the state expression of various hardware forming the pet robot 2.

In this case, in the tail unit 7, the state of various hardware forming the pet robot 2 may be represented based on the shaking or bending direction of the tail part 7T, the amplitude at shaking and its speed, the standstill position at bending and the momentaneous motion. Thereby, reaction like animals will be shown to the user, and a sense of affinity and a feeling of satisfaction can be given to the user.

For instance, in the pet robot 2, when there is no input via the microphones 15, the CCD camera 16, etc., or defective connection between each of the circuits has detected such as the case where one of parts has come off in each unit 4, 5A to 5D or 6 except the tail unit 7, or when the occurrence of abnormality has detected in a servo system or one of various sensors in each unit 4, 5A to 5D or 6, or when the internal sensor part 14 in the body unit 4 has detected that the inside of the pet robot 2 is in an overheating state, or when the internal sensor part 14 in the body unit 4 has detected that the remaining amount of the battery 11 is less, furthermore, when that a foothold of the pet robot 2 is unstable and there is the possibility of falling down has detected in advance, or when the program stored in the memory 10A has stopped, it may make the tail part 7T perform a motion that will not be performed in normal motions, such as shaking at a larger amplitude in a faster cycle.

Furthermore, it may be applied that an outside temperature measuring part not shown has been provided in the pet robot 2 to make the tail part 7T perform a desired attitude and motion according to the measured result. Moreover, when the controller 10 in the body unit 4 performs writing or reading the program from/to the memory 10A, the tail part 7T may be made to perform a desired attitude and motion. Moreover, communication means not shown may be provided in the body unit 4 to make the tail part 7T perform a desired attitude and a motion such as shaking according to the amount of data transmission or the state of communication or the like via the above communication means only when data is being transmitted/received.

In the aforementioned embodiment, it has dealt with the case where the present invention is applied to the quadpedestal walking type robot configured as FIG. 2. However, it is not only limited to this but also it can be widely applied to robots having various configurations other than that such as a robot in which a power source such as the battery 11 has been built in or the like. Moreover, at least one or more feelers (not shown) may be provided in the head unit 6 in addition to the tail part 7T in the tail unit 7 to make it move in the same way as the tail part 7T.

In the aforementioned embodiment, it has dealt with the case where the next motion is determined using the algorithm called finite automaton 70. However, the present invention is not only limited to this but also the next motion may be detected using an algorithm called state machine in which the number of states is not finite. In this case, a state is newly generated every time when the state recognition information D1 is supplied, and the next motion may be determined according to the above generated state. Furthermore, the next motion may be determined using an algorithm called probabilistic finite automaton in which plural states are selected based on the state recognition information D1 presently supplied and the state at that time as candidates of the destination of transition, and the state of the destination of transition is determined from the above selected plural states at random by random number.

In the aforementioned embodiment, it has dealt with the case where as the remaining amount of battery detecting means for detecting the remaining amount of the battery 11, the battery sensor 20 forming the internal sensor part 14 in the body unit 4 is applied. However, the present invention is not only limited to this but also various configurations may be applied other than that.

In the aforementioned embodiment, it has dealt with the case where the controller 10 is applied as the motion control means for changing the pet robot 2 to a specified attitude and/or making it appear a specified motion when the remaining amount of the battery 11 has become the prescribed level or below. However, the present invention is not only limited to this but also various configurations can be widely applied provided that the head unit 6 and/or the tail unit 7 is drive-controlled based on the emotion/instinct model part 51 read from the memory 10A to represent that by an attitude and that can be informed the user.

In the aforementioned embodiment, it has dealt with the case where when the remaining amount of the battery 11 has become the prescribed level or below, the pet robot 2 is changed to the attitude to move to the station. However, the present invention is not only limited to this but also the attitude may be various other attitudes provided that it is suitable for battery charging.

In the aforementioned embodiment, it has dealt with the case where the remaining amount of the battery 11 is detected in five levels and the motion of the pet robot 2 is reduced according to the above each level. However, the present invention is not only limited to this but also the remaining amount of the battery 11 in that the pet robot 2 is changed to the specified attitude and/or appears the specified motion may be freely set.

In the aforementioned embodiment, it has dealt with the case where as the temperature detecting means for detecting the internal temperature of the body unit 4, the thermosensor 13 forming the internal sensor part 14 of the body unit 4 is applied. However, the present invention is not limited to this but also various configurations can be applied other than that.

In the aforementioned embodiment, it has dealt with the case where the controller 10 is applied as the motion control means for changing the pet robot 2 to the predetermined attitude to and/or making it appear the predetermined motion when the internal temperature of the body unit 4 reaches the prescribed temperature and over. However, the present invention is not only limited to this but also various configurations can be widely applied provided that each of the leg units 5A to 5D can be drive-controlled based on the emotion/instinct model part 51 read from the memory 10A to make the pet robot 2 represent that by an attitude and that can be informed the user.

In the aforementioned embodiment, it has dealt with the case where when the internal temperature of the body unit 4 reaches the prescribed temperature and over, the pet robot 2 is made a transition to a motion that the body unit 4 is raised (that is, the attitude to "stand up"). However, the present invention is not only limited to this but also it may be shifted to various motions provided that it is a motion that the ventilating opening composed of the exhausting opening 4AX and the intake 4BX formed in the body unit 4 is opened.

In the aforementioned embodiment, it has dealt with the case where the pet robot 2 is changed to a predetermined attitude or made to appear a predetermined motion based on the detection result of the remaining amount of the battery 11 and the detection result of the internal temperature. However, the present invention is not only limited to this but also the motion of the pet robot 2 may be controlled according to the various internal states of the pet robot 2 other than that or the outside environment.

For instance, the pet robot 2 may be moved by selecting so that the gear ratio or the rotating speed of each actuator $5AA_1$ to $7A_2$ becomes into the most effective state. Besides, it may be that the more the remaining amount of the battery 11 reduces, the more the state is made a transition to the stage having the best energy efficiency in the stages of state transition in the finite automaton in the motion determining mechanism part 52. Furthermore, by measuring the external temperature at all times, it may make the pet robot 2 walk to a direction comparatively cool when the external temperature has risen.

Industrial Applicability

The robot system and the control method thereof can be applied to a pet robot and an amusement robot or the like.

What is claimed is:

1. A robot apparatus having a movable part of which one end has been connected freely in rotation in the direction of at least one axis or more, comprising:

motion control means for operating said movable part according to input information to be supplied; and emotion/instinct model changing means having emotion/instinct models caused by motion of said movable part, for changing said emotion/instinct model based on said input information and determining said motion of said movable part.

2. The robot apparatus according to claim 1, wherein said motion control means operates said movable part so as to bend, shake and/or turn centering around said one end.

3. The robot apparatus according to claim 1, wherein said input information is information on approaches from a user and/or information on environment around said robot apparatus.

4. A robot apparatus having a movable part of which one end has been connected freely in rotation in the direction of at least one axis or more, comprising:

detecting means for detecting the internal state of said robot apparatus; and motion control means for operating said movable part according to the detected result by said detecting means, wherein said motion control means operates said movable part so as to bend, shake and/or turn centering around said one end.

5. The robot apparatus according to claim 4, wherein said detecting means detects, as the internal state of said robot apparatus, one or more than one of states in a connecting state between each of the circuits in said robot apparatus, the operating state of a driving system and/or a sensor system in said robot apparatus, the state of the remaining amount of battery in said robot apparatus, the walking state of said robot apparatus and the starting state of a program stored in storing means in said robot apparatus.

6. The robot apparatus according to claim 4, further comprising temperature measuring means for measuring the temperature around said robot apparatus, and wherein said motion control means operates said movable part according to the measured result by said temperature measuring means.

7. The robot apparatus according to claim 4, further comprising communication means for communicating with the outside, and wherein said motion control means operates said movable part according to an amount of data transmission or the communicating state of said communication means.

8. A robot apparatus capable of having a battery built-in as a power source, comprising:

remaining amount of battery detecting means for detecting the remaining amount of said battery; and motion control means, if the remaining amount of said battery detected by said remaining amount of said battery detecting means becomes a prescribed level or below, for changing said robot apparatus into a predetermined posture and/or performing a predetermined motion.

9. The robot apparatus according to claim 8, wherein said predetermined posture is a posture suitable for battery charging.

10. The robot apparatus according to claim 8, wherein:

said remaining amount of battery detecting means detects the remaining amount of said battery in phased levels; and said motion control means reduces said specified motion of said robot apparatus in every said phase detected by said remaining amount of battery detecting means.

11. The robot apparatus according to claim 8, wherein said robot apparatus has a body part and a tail unit connected to the body part, and said predetermined motion is a shaking of said tail unit in specified directions and/or at a specified amplitude for indicating a shortage of the remaining amount of battery.

12. A robot apparatus having a body part capable of having a power source built-in and in that an exhausting opening has been formed at a predetermined position of said body part, comprising:

temperature detecting means for detecting the internal temperature of said body part; and motion control means, if said internal temperature detected by said temperature detecting means becomes a prescribed temperature and over, for changing said robot apparatus into a predetermined posture and/or performing a predetermined motion.

13. The robot apparatus according to claim 12, wherein said predetermined motion is a motion to raise said body part.

14. A method of controlling a robot apparatus having a battery built-in as a power source, comprising:

a first step of detecting the remaining amount of said battery; and a second step, if said detected remaining amount of said battery becomes a prescribed level or below, changing said robot apparatus into a predetermined posture and/or performing a predetermined motion.

15. The robot apparatus control method according to claim 14, wherein in said second step, said predetermined posture is a posture suitable for battery charging.

16. The robot apparatus control method according to claim 14, wherein:

in said first step, the remaining amount of said battery is detected in phased levels; and in said second step, said predetermined motion of said robot apparatus is reduced with every said detected phase.

17. A method of controlling a robot apparatus having a body part having a power source built-in and in that an exhausting opening has been formed at a predetermined position of said body part, comprising:

a first step of detecting an internal temperature of said body part; and a second step, if said detected internal temperature becomes a prescribed temperature or over, of changing said robot apparatus into a predetermined posture and/or performing a predetermined motion.

18. The robot apparatus control method according to claim 17, wherein in said second step, said predetermined motion is a motion to raise said body part.

* * * * *